(12) United States Patent
Tsuchida et al.

(10) Patent No.: US 10,673,057 B2
(45) Date of Patent: Jun. 2, 2020

(54) NEGATIVE ELECTRODE FOR LITHIUM ION BATTERY AND METHOD FOR PRODUCING NEGATIVE ELECTRODE FOR LITHIUM ION BATTERY

(71) Applicant: NISSAN MOTOR CO., LTD., Yokohama-shi, Kanagawa (JP)

(72) Inventors: Kazuya Tsuchida, Kanagawa (JP); Yusuke Nakashima, Kanagawa (JP); Yasuhiko Ohsawa, Kanagawa (JP); Yuki Kusachi, Kanagawa (JP); Hajime Satou, Kanagawa (JP); Hiroshi Akama, Kanagawa (JP); Hideaki Horie, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 16/470,610

(22) PCT Filed: Dec. 19, 2017

(86) PCT No.: PCT/JP2017/045484
§ 371 (c)(1),
(2) Date: Jun. 18, 2019

(87) PCT Pub. No.: WO2018/117086
PCT Pub. Date: Jun. 28, 2018

(65) Prior Publication Data
US 2019/0319254 A1    Oct. 17, 2019

(30) Foreign Application Priority Data

Dec. 20, 2016  (JP) ................................. 2016-246998
Dec. 13, 2017  (JP) ................................. 2017-238949

(51) Int. Cl.
| | | |
|---|---|---|
| *H01M 4/04* | (2006.01) | |
| *H01M 4/133* | (2010.01) | |
| *H01M 4/134* | (2010.01) | |
| *H01M 4/1393* | (2010.01) | |
| *H01M 4/1395* | (2010.01) | |
| *H01M 4/36* | (2006.01) | |
| *H01M 4/38* | (2006.01) | |
| *H01M 4/587* | (2010.01) | |
| *H01M 10/0525* | (2010.01) | |
| *H01M 4/62* | (2006.01) | |
| *H01M 4/02* | (2006.01) | |

(52) U.S. Cl.
CPC ....... *H01M 4/0404* (2013.01); *H01M 4/0445* (2013.01); *H01M 4/0459* (2013.01); *H01M 4/133* (2013.01); *H01M 4/134* (2013.01); *H01M 4/1393* (2013.01); *H01M 4/1395* (2013.01); *H01M 4/366* (2013.01); *H01M 4/386* (2013.01); *H01M 4/587* (2013.01); *H01M 4/62* (2013.01); *H01M 4/624* (2013.01); *H01M 10/0525* (2013.01); *H01M 2004/027* (2013.01)

(58) Field of Classification Search
CPC ............. H01M 4/0404; H01M 4/0445; H01M 4/0459; H01M 4/133; H01M 4/139; H01M 4/1393; H01M 4/1395; H01M 4/366; H01M 4/386; H01M 4/587; H01M 4/62; H01M 4/624; H01M 10/0525
USPC ....................................................... 429/231.8
See application file for complete search history.

(56) References Cited

U.S. PATENT DOCUMENTS

| | | | |
|---|---|---|---|
| 8,241,793 B2 * | 8/2012 | Zhamu ................. | H01M 4/134 429/231.8 |
| 2004/0029012 A1 | 2/2004 | Tanizaki et al. | |
| 2014/0287317 A1 * | 9/2014 | Tiquet ................... | C01B 33/02 429/231.8 |
| 2014/0356723 A1 * | 12/2014 | Suehiro ................. | H01M 4/131 429/231.4 |
| 2016/0118655 A1 | 4/2016 | Yoshikawa et al. | |
| 2016/0156025 A1 | 6/2016 | Shin et al. | |
| 2017/0012283 A1 | 1/2017 | Mizuno et al. | |
| 2017/0103856 A1 * | 4/2017 | Zhamu ................... | H01G 11/02 |
| 2017/0104204 A1 * | 4/2017 | Zhamu ............... | H01M 4/0416 |
| 2017/0294648 A1 * | 10/2017 | Burshtain ........... | H01M 4/0404 |
| 2019/0123339 A1 * | 4/2019 | Yushin ................. | H01M 4/134 |
| 2019/0165365 A1 * | 5/2019 | Zhamu ................. | H01M 4/133 |

FOREIGN PATENT DOCUMENTS

| | | |
|---|---|---|
| JP | 2003-331826 A | 11/2003 |
| JP | 2004-182512 A | 7/2004 |
| JP | 2010-192255 A | 9/2010 |
| JP | 2015-173071 A | 10/2015 |
| JP | 2016-103337 A | 6/2016 |
| WO | WO 2015/137041 A1 | 9/2015 |

OTHER PUBLICATIONS

Machine translation of JP 2015-173071 (no date).*

* cited by examiner

*Primary Examiner* — Amanda C. Walke
(74) *Attorney, Agent, or Firm* — Foley & Lardner LLP

(57) ABSTRACT

To provide a negative electrode for a lithium ion battery in which a volume change of a silicon-based negative electrode active material due to charging and discharging is small, and a production method therefor.
Provided is a method for producing a negative electrode for a lithium ion battery, the method including a step of forming a coating film on a current collector or a separator by using a slurry containing a negative electrode active material composition, which contains a silicon-based negative electrode active material and a carbon-based negative electrode active material, and a dispersion medium, in which the method further includes a step of doping the silicon-based negative electrode active material with lithium ions and a step of doping the carbon-based negative electrode active material with lithium ions before or after the step of forming the coating film and before assembling a lithium ion battery, and the method does not substantially include a step of drying the coating film.

13 Claims, No Drawings

NEGATIVE ELECTRODE FOR LITHIUM ION BATTERY AND METHOD FOR PRODUCING NEGATIVE ELECTRODE FOR LITHIUM ION BATTERY

TECHNICAL FIELD

The present invention relates to a negative electrode for a lithium ion battery and a method for producing a negative electrode for a lithium ion battery.

BACKGROUND ART

In recent years, there has been a strong demand for a reduction of the amount of carbon dioxide emission for environmental protection. In the automobile industry, expectations have been attracted to the reduction of the amount of carbon dioxide emission caused by introduction of an electric vehicle (EV) or a hybrid electric vehicle (HEV), and the development of a secondary battery for motor driving, which serves as a key for practicalization of these, is being assiduously carried out. As the secondary battery, attention has been paid to a lithium ion battery which can achieve high energy density and high output density.

For increasing energy density of a lithium ion battery, attention has been paid to a silicon-based material (silicon, a silicon compound, and the like) having a larger theoretical capacity than a carbon material used as a negative electrode active material in the related art. However, in a case where the silicon-based material is used as the negative electrode active material, a volume change of the material in accordance with charging and discharging is large. Therefore, the silicon-based material itself is disintegrated due to the volume change or easily peeled off from the surface of a current collector, so that it was difficult to improve cycle characteristics.

Patent Literature 1 discloses a lithium ion battery in which expansion of a negative electrode is suppressed by adjusting a mixing ratio of carbon and at least one of silicon and a silicon compound and particle diameters thereof to a predetermined range.

Patent Literature 2 discloses a carbon material which contains carbon particles and fibrous carbon having a carbonaceous material containing Si and/or a Si compound deposited on at least a part of the surface of carbon particles having a graphite structure, the carbonaceous material being obtained by heat treating a composition containing a polymer. Further, an electrode paste containing the carbon material and a binder (binding agent) and an electrode containing the electrode paste are also disclosed.

CITATION LIST

Patent Literatures

Patent Literature 1: JP 2016-103337 A (US 2016/156,025 A)
Patent Literature 2: JP 2004-182512 A

SUMMARY OF INVENTION

Technical Problem

However, since a binding agent is used in the electrodes (negative electrodes) described in Patent Literatures 1 and 2, when the thickness of the electrode excessively increases, a problem arises in that a negative electrode active material is peeled off from the surface of a negative electrode current collector. Further, since the proportion of the active material is decreased by the amount of the binding agent used, a problem arises in that energy density is reduced. Furthermore, expansion and shrinkage of silicon and the silicon compound is restricted by the binding agent so that the negative electrode active material itself is easily disintegrated. Moreover, the effect of suppressing the expansion of the negative electrode at the time of charging is also not sufficient, and there is a room for further improvement. Incidentally, hereinafter, in the present specification, the silicon and the silicon compound used as the negative electrode active material are collectively referred to as the "silicon-based negative electrode active material".

Further, the volume change of the silicon-based negative electrode active material becomes most significant at the initial charging and discharging in which the silicon-based negative electrode active material occludes or releases lithium ions. Therefore, suppressing of the volume change at the initial charging and discharging is considered to be important in order to improve characteristics of the negative electrode.

The present invention has been made in view of the above-described problems, and an object thereof is to provide a negative electrode for a lithium ion battery in which a volume change of a silicon-based negative electrode active material due to charging and discharging is small, and a production method therefor.

Solution to Problem

The present inventors have conducted intensive studies in order to solve the above-described problems, and as a result, have reached the present invention.

That is, the present invention relates to a method for producing a negative electrode for a lithium ion battery, the method including a step of forming a coating film on a current collector or a separator by using a slurry containing a negative electrode active material composition, which contains a silicon-based negative electrode active material and a carbon-based negative electrode active material, and a dispersion medium. The production method has a feature in that the method further includes a step of doping the silicon-based negative electrode active material with lithium ions and a step of doping the carbon-based negative electrode active material with lithium ions before or after the step of forming the coating film and before assembling a lithium ion battery, and does not substantially include a step of drying the coating film.

Effect of Invention

According to the method for producing a negative electrode for a lithium ion battery of the present invention, it is possible to provide a negative electrode for a lithium ion battery in which a volume change of a silicon-based negative electrode active material due to charging and discharging is small.

DESCRIPTION OF EMBODIMENTS

Hereinafter, the present invention will be described in detail.

First, a negative electrode for a lithium ion battery obtained by a production method of the present invention will be described. The negative electrode for a lithium ion battery of the present invention is obtained by a production method to be described later and has a negative electrode active material layer formed from a non-bound body of a negative electrode active material composition which contains a carbon-based negative electrode active material doped with lithium ions and a silicon-based negative electrode active material doped with lithium ions.

The negative electrode for a lithium ion battery of the present invention includes a negative electrode active material layer. The negative electrode active material layer is formed from a non-bound body of a negative electrode active material composition which contains a carbon-based negative electrode active material doped with lithium ions and a silicon-based negative electrode active material doped with lithium ions. It is preferable that the negative electrode active material layer is disposed on a negative electrode current collector.

The silicon-based negative electrode active material is preferably silicon and/or a silicon compound. The silicon may be crystalline silicon, amorphous silicon, or mixtures thereof. As the silicon compound, for example, at least one selected from the group consisting of silicon oxide ($SiO_x$), a Si—C complex, a Si—Al alloy, a Si—Li alloy, a Si—Ni alloy, a Si—Fe alloy, a Si—Ti alloy, a Si—Mn alloy, a Si—Cu alloy, and a Si—Sn alloy. Examples of the Si—C complex include silicon carbide, those in which the surface of carbon particles is coated with silicon and/or silicon carbide, those in which the surface of silicon particles or silicon oxide particles is coated with carbon and/or silicon carbide, and the like.

It is preferable that the silicon particles and/or the silicon compound particles are aggregated to form composite particles (that is, secondary particles obtained by aggregating primary particles). The composite particles maybe particles obtained by aggregating only silicon particles and/or silicon oxide particles or particles obtained by aggregating silicon particles and/or silicon oxide particles via a polymer compound. As the polymer compound at this time, for example, the same polymer compound as a polymer compound used as a coating resin of a carbon-based coated negative electrode active material to be described later can be used. Further, the composite particles may contain a conductive aid if necessary. As the conductive aid at this time, the same conductive aid as a conductive aid contained in a negative electrode coating layer of a carbon-based coated negative electrode active material to be described later can be used. Examples of a method for forming composite particles include a method of mixing primary particles of silicon and/or silicon compound particles with a coating resin to be described later.

The volume average particle size of the silicon-based negative electrode active material is not particularly limited, but the primary particle size is preferably 0.01 to 10 μm from the viewpoint of durability, and in a case where composite particles are formed, the secondary particle size is more preferably 10 to 30 μm. Incidentally, the silicon-based negative electrode active material is expanded by being doped with lithium ions, but the volume average particle size described herein means the particle size of the silicon-based negative electrode active material before being doped with lithium ions. The volume average particle size means the particle size (Dv50) at a cumulative value of 50% in a particle size distribution obtained by a Microtrac method (laser diffraction and scattering method). The Microtrac method is a method for obtaining a particle size distribution by utilizing scattered light that is obtained by irradiating particles with laser light, and MicroTrac manufactured by NIKKISO CO., LTD., and the like can be used in the measurement.

The silicon-based negative electrode active material is doped with lithium ions. By being doped with lithium ions, a state in which the initial charging of the silicon-based negative electrode active material has already been finished is created. Therefore, a negative electrode for a lithium ion battery which is not affected by the initial charging and discharging at which the largest volume change occurs and in which a volume change of the silicon-based negative electrode active material due to subsequent charging and discharging is small is obtained.

As the carbon-based negative electrode active material, carbon-based materials [for example, graphite, non-graphitizable carbon, amorphous carbon, a resin calcined body (for example, a product obtained by calcining a phenolic resin, a furan resin, and the like to be carbonized, or the like), cokes (for example, pitch coke, needle coke, petroleum coke, and the like)], or mixtures of carbon-based materials with electroconductive polymers (for example, polyacetylene, polypyrrole, and the like), metal oxides (titanium oxide and lithium titanium oxide), metal alloys (a lithium-tin alloy, a lithium-aluminum alloy, an aluminum-manganese alloy, and the like), and the like may be exemplified.

The volume average particle size of the carbon-based negative electrode active material is preferably 0.1 to 50 μm and more preferably 15 to 20 μm from the viewpoint of electric characteristics of the negative electrode for a lithium ion battery. Incidentally, the carbon-based negative electrode active material is expanded by being doped with lithium ions, but the volume average particle size described herein means the volume average particle size before being doped with lithium ions. Further, the volume average particle size means the particle size (Dv50) at a cumulative value of 50% in a particle size distribution obtained by a Microtrac method (laser diffraction and scattering method). The Microtrac method is a method for obtaining a particle size distribution by utilizing scattered light that is obtained by irradiating particles with laser light, and MicroTrac manufactured by NIKKISO CO., LTD., and the like can be used in the measurement.

Also the carbon-based negative electrode active material is doped with lithium ions.

Further, the negative electrode active material layer is formed from a non-bound body of a negative electrode active material composition containing a carbon-based negative electrode active material doped with lithium ions and a silicon-based negative electrode active material doped with lithium ions.

Generally, in a case where the initial charging and discharging is performed on the lithium ion battery, lithium ions not released from the negative electrode at the time of discharging exist, but when the silicon-based negative electrode active material and the carbon-based negative electrode active material are doped with lithium ions, burden on the positive electrode active material to compensate lithium ions corresponding to lithium ions not released from the negative electrode is small. Therefore, the amount of electricity used for the initial charging can be used for discharging, which thus can reduce the irreversible capacity.

Further, since the positive electrode active material that supplies lithium ions at the time of charging is generally expensive, the amount of the positive electrode active material used can be reduced by being doped with lithium ions in advance. Furthermore, by being doped with lithium ions in advance, it is prevented that the electrolyte solution is decomposed at the initial charging to generate gas, so that a degassing step can be omitted at the time of producing a lithium ion battery.

The non-bound body of the negative electrode active material composition means a state in which positions of the silicon-based negative electrode active material and the carbon-based negative electrode active material are not fixed to each other by a binding agent (also called a binder). Since a negative electrode active material layer in a lithium ion battery of the related art is produced by applying a slurry, which is obtained by dispersing the silicon-based negative electrode active material, the carbon-based negative electrode active material, and the binding agent in a dispersion medium (solvent), to a surface of a negative electrode current collector or the like, and heating and drying the slurry, the negative electrode active material layer is brought in a state of being solidified by the binding agent. At this time, the negative electrode active materials are fixed to each other by the binding agent, and the positions of the silicon-based negative electrode active material and the carbon-based negative electrode active material are fixed. Further, when the negative electrode active material layer is solidified by the binding agent, excessive stress is applied to the silicon-based negative electrode active material due to expansion and shrinkage at the time of charging and discharging, so that the silicon-based negative electrode active material itself is easily disintegrated. Furthermore, since the negative electrode active material layer is fixed onto the negative electrode current collector or the separator by the binding agent, cracks may occur in the negative electrode active material layer solidified by the binding agent due to expansion and shrinkage of the silicon-based negative electrode active material at the time of charging and discharging, or the negative electrode active material layer may be peeled off or dropped out from the surface of the negative electrode current collector.

In order to obtain a negative electrode active material layer formed from a non-bound body of a negative electrode active material composition, in a method for producing a negative electrode for a lithium ion battery to be described later, a method by which a step of drying the coating film formed from the slurry when the negative electrode active material layer is formed is not substantially included is exemplified. Further, the negative electrode active material layer formed from a non-bound body of a negative electrode active material composition can also be formed by a method by which the negative electrode active material layer (a slurry for forming a negative electrode active material layer) does not substantially contain a binding agent. Herein, the fact that the negative electrode active material layer (the slurry for forming a negative electrode active material layer) does not substantially contain a binding agent specifically means that the content of the binding agent is 1% by mass or less with respect to 100% by mass of the total solid content amount contained in the negative electrode active material layer (the slurry for forming a negative electrode active material layer). The content of the binding agent is more preferably 0.5% by mass or less, even more preferably 0.2% by mass or less, particularly preferably 0.1% by mass or less, and most preferably 0% by mass.

Incidentally, in the present specification, the binding agent which the negative electrode active material layer does not substantially contain means a binding agent for a lithium ion battery that is a known solvent (dispersion medium) dry type used for bonding and fixing the negative electrode active material particles, and negative electrode active material particles and the current collector. Examples thereof include starch, polyvinylidene fluoride, polyvinyl alcohol, carboxymethyl cellulose, polyvinyl pyrolidone, tetrafluoroethylene, and styrene-butadiene rubber. These binding agents for a lithium ion battery are used by being dissolved or dispersed in water or an organic solvent, and a solvent (dispersion medium) component is volatilized to be dried and solidified so that the negative electrode active material particles, and the negative electrode active material particles and the current collector are firmly fixed. Incidentally, the negative electrode active material particles described herein are a concept which encompasses both silicon-based active material particles and carbon-based negative electrode active material particles.

When the step of drying the slurry of the binding agent is not substantially included in the method for producing a negative electrode for a lithium ion battery or the negative electrode active material layer (the slurry for forming a negative electrode active material layer) does not substantially contain the binding agent, the negative electrode active material particles are not firmly fixed by the binding agent and expansion and shrinkage of the silicon-based negative electrode active material at the time of charging and discharging are not restricted, so that self-disintegration of the silicon-based negative electrode active material can be suppressed. Further, since the negative electrode active material layer that constitutes the negative electrode for a lithium ion battery of the present invention is not fixed onto the surface of the negative electrode current collector by the binding agent, cracks do not occur in the negative electrode active material layer due to expansion and shrinkage of the silicon-based negative electrode active material at the time of charging and discharging and the negative electrode active material layer is not peeled off. Therefore, a degradation in cycle characteristics can be suppressed.

Thus, the negative electrode for a lithium ion battery of the present invention is excellent in energy density and cycle characteristics. Since a silicon-based negative electrode active material having a large theoretical capacity is contained in the negative electrode active material layer, the negative electrode for a lithium ion battery is excellent in energy density.

In a case where the negative electrode active material layer contains the silicon-based negative electrode active material and the carbon-based negative electrode active material, the mass mixing ratio of the silicon-based negative electrode active material and the carbon-based negative electrode active material is preferably 5:95 to 50:50. The mass mixing ratio thereof is more preferably 30:70 to 45:55. When the mass mixing ratio thereof is within the above range, the effect of increasing the energy density by the silicon-based negative electrode active material becomes sufficient. Further, there is no case where the volume expansion of the negative electrode active material layer at the time of charging excessively increases. Incidentally, in a case where the silicon-based negative electrode active material contains silicon and the silicon compound, the mass of the silicon-based negative electrode active material is defined as the total mass of silicon and the silicon compound.

The thickness of the negative electrode active material layer is not particularly limited, but is preferably 100 to 1500 μm, more preferably 200 to 800 μm, and even more preferably 300 to 600 μm. By adjusting the thickness of the negative electrode active material layer to the above range, a thicker electrode can be obtained as compared to a negative electrode of the related art, and the amount of the active material contained in the negative electrode increases.

Further, since the energy density also increases when the silicon-based negative electrode active material is contained in the negative electrode active material layer, a negative electrode having a high energy density and a high capacity can be obtained. Further, the thickness of the negative electrode active material layer is regarded as a thickness before the negative electrode active material layer is subjected to charging or when the negative electrode active material layer is discharged to an electrode potential value+ 0.05 V (vs. Li/Li$^+$) or less.

The carbon-based negative electrode active material contained in the negative electrode active material layer may be the very carbon-based negative electrode active material or a carbon-based coated negative electrode active material in which the surface of the carbon-based negative electrode active material is partially or entirely coated with a negative electrode coating layer containing a polymer compound as a coating resin, but is preferably a carbon-based coated negative electrode active material. When the surface of the carbon-based negative electrode active material is coated with a coating layer, a distance between the negative electrode active materials is easily held to be constant and a conductive path is easily maintained, which is preferable.

In a case where the carbon-based negative electrode active material is a carbon-based coated negative electrode active material doped with lithium ions, it is preferable that the carbon-based negative electrode active material is doped with lithium ions. In other words, it is preferable that the negative electrode coating layer coating the circumference of the carbon-based coated negative electrode active material is not doped with lithium ions but the carbon-based negative electrode active material at the center of the carbon-based coated negative electrode active material is doped with lithium ions.

The ratio of the mass of the polymer compound to the mass of the carbon-based coated negative electrode active material is not particularly limited, but is preferably 0.01 to 20% by mass.

The negative electrode coating layer contains a polymer compound that is a coating resin. Further, if necessary, the negative electrode coating layer may further contain a conductive aid to be described later.

Incidentally, in the carbon-based coated negative electrode active material, the surface of the carbon-based negative electrode active material is partially or entirely coated with the negative electrode coating layer containing a polymer compound, but in the negative electrode active material layer, for example, even when the carbon-based coated negative electrode active materials are in contact with each other, the negative electrode coating layers are not irreversibly attached to each other in the contact surface, attachment is temporary, and the negative electrode coating layers can be easily loosened by a hand. Therefore, the carbon-based coated negative electrode active materials are not fixed by the negative electrode coating layer. Thus, in the negative electrode active material layer containing the carbon-based coated negative electrode active material, the carbon-based negative electrode active materials are not bonded to each other (that is, the negative electrode active material layer is a non-bound body of a negative electrode active material composition).

More specifically, it is possible to confirm whether the negative electrode active material layer is formed from a non-bound body of a negative electrode active material composition by observing whether the negative electrode active material layer is disintegrated in a case where the negative electrode active material layer is completely immersed in the electrolyte solution. In a case where the negative electrode active material layer is formed from a bound body of a negative electrode active material composition, the shape thereof can be maintained for one minute or longer, but in a case where the negative electrode active material layer is formed from a non-bound body of a negative electrode active material composition, the shape is disintegrated in shorter than one minute.

As the polymer compound that constitutes the negative electrode coating layer, a thermoplastic resin, a thermosetting resin, and the like are mentioned, and examples thereof include a fluororesin, an acrylic resin, a urethane resin, a polyester resin, a polyether resin, a polyamide resin, an epoxy resin, a polyimide resin, a silicone resin, a phenolic resin, a melamine resin, a urea resin, an aniline resin, an ionomer resin, a polycarbonate, a polysaccharide (sodium alginate or the like), mixtures thereof, and the like. Among these, an acrylic resin, a urethane resin, a polyester resin, and a polyamide resin are preferred, and an acrylic resin is more preferred.

Among these, a polymer compound having a liquid absorption ratio at the time of being immersed in an electrolyte solution of 10% or more and having a tensile elongation at break in a state of saturated liquid absorption of 10% or more is more preferred.

The liquid absorption ratio at the time of being immersed in an electrolyte solution is obtained by the following formula, by measuring the mass of the polymer compound before being immersed and after being immersed in the electrolyte solution.

Liquid absorption ratio (%)=[(Mass of polymer compound after being immersed in electrolyte solution−Mass of polymer compound before being immersed in electrolyte solution)/Mass of polymer compound before being immersed in electrolyte solution]×100

As the electrolyte solution for obtaining the liquid absorption ratio, it is preferable to use an electrolyte solution having LiPF$_6$ as an electrolyte dissolved at a concentration of 1 mol/L in a mixed solvent obtained by mixing ethylene carbonate (EC) and propylene carbonate (PC) at a volume ratio of EC:PC=1:1. Immersion in the electrolyte solution at the time of obtaining the liquid absorption ratio is carried out for 3 days at 50° C. By performing immersion for 3 days at 50° C., the polymer compound is brought into a state of saturated liquid absorption. Incidentally, the state of saturated liquid absorption refers to a state in which the mass of the polymer compound does not increase even if the polymer compound is immersed in the electrolyte solution for a longer time. Incidentally, the electrolyte solution used at the time of producing a lithium ion battery using the negative electrode for a lithium ion battery of the present invention is not limited to the above-described electrolyte solution, and other electrolyte solution may be used.

When the liquid absorption ratio is 10% or more, lithium ions can easily permeate through the polymer compound, and thus ion resistance can be maintained to be low in the negative electrode active material layer. When the liquid absorption ratio is less than 10%, the conductivity for lithium ions is decreased, and the performance as a lithium ion battery may not be sufficiently exhibited. The liquid absorption ratio is preferably 20% or more and more preferably 30% or more. Further, a preferred upper limit of the liquid absorption ratio is 400%, and a more preferred upper limit is 300%.

The tensile elongation at break in a state of saturated liquid absorption can be measured according to ASTM D683

(specimen shape Type II) by punching a polymer compound into a dumbbell shape, performing immersion in an electrolyte solution for 3 days at 50° C. similarly to the measurement of the liquid absorption ratio, and thereby bringing the polymer compound into a state of saturated liquid absorption. The tensile elongation at break is a value obtained by calculating the elongation ratio until the specimen breaks during a tensile test, by the following formula.

Tensile elongation at break (%)=[(Specimen length at break−Specimen length before test)/Specimen length before test]×100

When the tensile elongation at break of the polymer compound in a state of saturated liquid absorption is 10% or more, the polymer compound has adequate flexibility so that it is easy to suppress detachment of the negative electrode coating layer caused by volume change of the carbon-based negative electrode active material at the time of charging and discharging. The tensile elongation at break is preferably 20% or more and more preferably 30% or more. Further, a preferred upper limit of the tensile elongation at break is 400%, and a more preferred upper limit is 300%.

An acrylic resin is preferably a resin formed to include a polymer (A1) having an acrylic monomer (a) as an essential constituent monomer.

It is particularly preferable that the polymer (A1) is a polymer of a monomer composition including a monomer (a1) having a carboxyl group or an acid anhydride group and a monomer (a2) represented by the following General Formula (1) as acrylic monomers (a).

$$CH_2=C(R^1) COOR^2 \quad (1)$$

[In Formula (1), $R^1$ represents a hydrogen atom or a methyl group, and $R^2$ represents a linear alkyl group having 4 to 12 carbon atoms or a branched alkyl group having 3 to 36 carbon atoms.]

Examples of the monomer (a1) having a carboxyl group or an acid anhydride group include a monocarboxylic acid having 3 to 15 carbon atoms, such as (meth)acrylic acid (a11), crotonic acid, or cinnamic acid; a dicarboxylic acid having 4 to 24 carbon atoms, such as (anhydrous) maleic acid, fumaric acid, (anhydrous) itaconic acid, citraconic acid, or mesaconic acid; a trivalent, tetravalent, or higher-valent polycarboxylic acid having 6 to 24 carbon atoms, such as aconitic acid, and the like. Among these, (meth) acrylic acid (a11) is preferred, and methacrylic acid is more preferred.

In the monomer (a2) represented by General Formula (1), it is preferable that $R^1$ represents a methyl group. It is preferable that $R^2$ represents a linear or branched alkyl group having 4 to 12 carbon atoms, or a branched alkyl group having 13 to 36 carbon atoms.

(a21) Ester compound in which $R^2$ represents linear or branched alkyl group having 4 to 12 carbon atoms Examples of a linear alkyl group having 4 to 12 carbon atoms include a butyl group, a pentyl group, a hexyl group, a heptyl group, an octyl group, a nonyl group, a decyl group, an undecyl group, and a dodecyl group.

Examples of a branched alkyl group having 4 to 12 carbon atoms include a 1-methylpropyl group (sec-butyl group), a 2-methylpropyl group, a 1, 1-dimethylethyl group (tert-butyl group), a 1-methylbutyl group, a 1,2-dimethylpropyl group, a 1,2-dimethylpropyl group, a 2,2-dimethylpropyl group (neopentyl group), a 1-methylpentyl group, a 2-methylpentyl group, a 3-methylpentyl group, a 4-methylpentyl group, a 1,1-dimethylbutyl group, a 1,2-dimethylbutyl group, a 1,3-dimethylbutyl group, a 2,2-dimethylbutyl group, a 2, 3-dimethylbutyl group, a 1-ethylbutyl group, a 2-ethylbutyl group, a 1-methylhexyl group, a 2-methylhexyl group, a 2-methylhexyl group, a 4-methylhexyl group, a 5-methylhexyl group, a 1-ethylpentyl group, a 2-ethylpentyl group, a 3-ethylpentyl group, a 1,1-dimethylpentyl group, a 1,2-dimethylpentyl group, a 1,3-dimethylpentyl group, a 2,2-dimethylpentyl group, a 2,3-dimethylpentyl group, a 2-ethylpentyl group, a 1-methylheptyl group, a 2-methylheptyl group, a 3-methylheptyl group, a 4-methylheptyl group, a 5-methylheptyl group, a 6-methylheptyl group, a 1,1-dimethylhexyl group, a 1,2-dimethylhexyl group, a 1,3-dimethylhexyl group, a 1,4-dimethylhexyl group, a 1,5-dimethylhexyl group, a 1-ethylhexyl group, a 2-ethylhexyl group, a 1-methyloctyl group, a 2-methyloctyl group, a 3-methyloctyl group, a 4-methyloctyl group, a 5-methyloctyl group, a 6-methyloctyl group, a 7-methyloctyl group, a 1,1-dimethylheptyl group, a 1,2-dimethylheptyl group, a 1,3-dimethylheptyl group, a 1,4-dimethylheptyl group, a 1,5-dimethylheptyl group, a 1,6-dimethylheptyl group, a 1-ethylheptyl group, a 2-ethylheptyl group, a 1-methylnonyl group, a 2-methylnonyl group, a 3-methylnonyl group, a 4-methylnonyl group, a 5-methylnonyl group, a 6-methylnonyl group, a 7-methylnonyl group, a 8-methylnonyl group, a 1,1-dimethyloctyl group, a 1,2-dimethyloctyl group, a 1,3-dimethyloctyl group, a 1,4-dimethyloctyl group, a 1,5-dimethyloctyl group, a 1,6-dimethyloctyl group, a 1,7-dimethyloctyl group, a 1-ethyloctyl group, a 2-ethyloctyl group, 1-methyldecyl group, a 2-methyldecyl group, a 3-methyldecyl group, a 4-methyldecyl group, a 5-methyldecyl group, a 6-methyldecyl group, a 7-methyldecyl group, a 8-methyldecyl group, a 9-methyldecyl group, a 1,1-dimethylnonyl group, a 1,2-dimethylnonyl group, a 1,3-dimethylnonyl group, a 1,4-dimethylnonyl group, a 1,5-dimethylnonyl group, a 1,6-dimethylnonyl group, a 1,7-dimethylnonyl group, a 1,8-dimethylnonyl group, a 1-ethylnonyl group, a 2-ethylnonyl group, a 1-methylundecyl group, a 2-methylundecyl group, a 3-methylundecyl group, a 4-methylundecyl group, a 5-methylundecyl group, a 6-methylundecyl group, a 7-methylundecyl group, a 8-methylundecyl group, a 9-methylundecyl group, a 10-methylundecyl group, a 1,1-dimethyldecyl group, a 1,2-dimethyldecyl group, a 1,3-dimethyldecyl group, a 1,4-dimethyldecyl group, a 1,5-dimethyldecyl group, a 1,6-dimethyldecyl group, a 1,7-dimethyldecyl group, a 1,8-dimethyldecyl group, a 1,9-dimethyldecyl group, a 1-ethyldecyl group, a 2-ethyldecyl group, and the like. Among these, particularly, a 2-ethylhexyl group is preferred.

(a22) Ester compound in which $R^2$ is branched alkyl group having 13 to 36 carbon atoms Examples of a branched alkyl group having 13 to 36 carbon atoms include a 1-alkylalkyl group [a 1-methyldodecyl group, a 1-butyleicosyl group, a 1-hexyloctadecyl group, a 1-octylhexadecyl group, a 1-decyltetradecyl group, a 1-undecyltridecyl group, or the like], a 2-alkylalkyl group [a 2-methyldodecyl group, a 2-hexyloctadecyl group, a 2-octylhexadecyl group, a 2-decyltetradecyl group, a 2-undecyltridecyl group, a 2-dodecylhexadecyl group, a 2-tridecylpentadecyl group, a 2-decyloctadecyl group, a 2-tetradecyloctadecyl group, a 2-hexadecyloctadecyl group, a 2-tetradecyleicosyl group, a 2-hexadecyleicosyl group, or the like], a 3- to 34-alkylalkyl group (a 3-alkylalkyl group, a 4-alkylalkyl group, 5-alkylalkyl group, a 32-alkylalkyl group, a 33-alkylalkyl group, a 34-alkylalkyl group, and the like), and mixed alkyl groups including one or more branched alkyl groups, such as residues obtained by excluding hydroxyl groups from oxo alcohols obtainable from a propylene oligomer (7- to 11-mers), an ethylene/propylene (molar ratio 16/1 to 1/11) oligomer, an isobutylene oligomer (7- to 8-mers), an α-olefin (carbon numbers 5 to 20) oligomer (4- to 8-mers), and the like.

It is preferable that the polymer (A1) further contains an ester compound (a3) between a monohydric aliphatic alcohol having 1 to 3 carbon atoms and (meth)acrylic acid.

Examples of the monohydric aliphatic alcohol having 1 to 3 carbon atoms that constitutes the ester compound (a3) include methanol, ethanol, 1-propanol, 2-propanol, and the like.

The content of the ester compound (a3) is, from the viewpoint of suppressing volume change in the negative electrode active material or the like, preferably 10 to 60% by mass, more preferably 15 to 55% by mass, and even more preferably 20 to 50% by mass, based on the total mass of the polymer (A1).

Further, the polymer (A1) may further contain a salt (a4) of an anionic monomer having a polymerizable unsaturated double bond and an anionic group.

Examples of a structure having a polymerizable unsaturated double bond include a vinyl group, an allyl group, a styrenyl group, a (meth)acryloyl group, and the like. Incidentally, the (meth)acryloyl group means an acryloyl group and/or a methacryloyl group.

Examples of the anionic group include a sulfonic acid group, a carboxyl group, and the like.

An anionic monomer having a polymerizable unsaturated double bond and an anionic group is a compound containable by combination of these, and examples thereof include vinylsulfonic acid, allylsulfonic acid, styrenesulfonic acid, and (meth)acrylic acid.

Examples of a cation that constitutes the salt (a4) of an anionic monomer include lithium ion, sodium ion, potassium ion, ammonium ion, and the like.

In a case where the salt (a4) of an anionic monomer is included, the content thereof is, from the viewpoint of internal resistance or the like, preferably 0.1 to 15% by mass, more preferably 1 to 15% by mass, and even more preferably 2 to 10% by mass, based on the total mass of the polymer compound.

It is preferable that the polymer (A1) contains (meth)acrylic acid (a11) and an ester compound (a21), and it is more preferable that the polymer (A1) contains an ester compound (a3).

It is particularly preferable that the polymer (A1) is a copolymer of methacrylic acid, 2-ethylhexyl methacrylate, and methyl methacrylate, which uses methacrylic acid as the (meth)acrylic acid (a11), uses 2-ethylhexyl methacrylate as the ester compound (a21), and uses methyl methacrylate as the ester compound (a3).

It is preferable that the polymer compound is formed by polymerizing a monomer composition formed to include (meth)acrylic acid (a11), the above-described monomer (a2), an ester compound (a3) of a monohydric aliphatic alcohol having 1 to 3 carbon atoms and (meth)acrylic acid, and a salt (a4) of an anionic monomer having a polymerizable unsaturated double bond and an anionic group, which is used as necessary, and the mass ratio of the monomer (a2) and the (meth)acrylic acid (a11) [the monomer (a2)/the (meth)acrylic acid (a11)] is 10/90 to 90/10. When the mass ratio of the monomer (a2) and the (meth)acrylic acid (a11) is 10/90 to 90/10, a polymer formed by polymerizing this has satisfactory adhesiveness to a carbon-based negative electrode active material and is not easily detachable. The mass ratio is preferably 20/80 to 80/20, more preferably 30/70 to 85/15, and even more preferably 40/60 to 70/30.

Further, in the monomers that constitute the polymer (A1), in addition to the monomer (a1) having a carboxyl group or an acid anhydride group, the monomer (a2) represented by General Formula (1), the ester compound (a3) of a monohydric aliphatic alcohol having 1 to 3 carbon atoms and (meth)acrylic acid, and the salt (a4) of an anionic monomer having a polymerizable unsaturated double bond and an anionic group, within a range that does not adversely affect physical properties of the polymer (A1), a radical-polymerizable monomer (a5) that can be copolymerized with the monomer (a1), the monomer (a2) represented by General Formula (1), and the ester compound (a3) of a monohydric aliphatic alcohol having 1 to 3 carbon atoms and (meth)acrylic acid may also be included.

As the radical-polymerizable monomer (a5), a monomer that does not contain activated hydrogen is preferred, and monomers of the following (a51) to (a58) can be used.

(a51) Hydrocarbyl(meth)acrylate Formed from Linear Aliphatic Monool Having 13 to 20 Carbon Atoms, Alicyclic Monool Having 5 to 20 Carbon Atoms, or Aromatic Aliphatic Monool Having 7 to 20 Carbon Atoms and (meth)acrylic Acid Examples of the monool include (i) a linear aliphatic monool (tridecyl alcohol, myristyl alcohol, pentadecyl alcohol, cetyl alcohol, heptadecyl alcohol, stearyl alcohol, nonadecyl alcohol, arachidyl alcohol, or the like), (ii) alicyclic monool (cyclopentyl alcohol, cyclohexyl alcohol, cycloheptyl alcohol, cyclooctyl alcohol, or the like), (iii) aromatic aliphatic monool (benzyl alcohol, or the like), and mixture of two or more kinds of these.

(a52) Poly (n=2 to 30) Oxyalkylene (Carbon Number 2 to 4) Alkyl (Carbon Number 1 to 18) Ether(meth)acrylate [(meth)acrylate of a 10-Mol Ethylene Oxide (Hereinafter, Abbreviated to EO) Adduct of Methanol, (meth)acrylate of a 10-Mol Propylene Oxide (Hereinafter, Abbreviated to PO) Adduct of Methanol, or the Like]

(a53) Nitrogen-containing Vinyl Compounds (a53-1) Amide Group-containing Vinyl Compound (i) A (meth)acrylamide compound having 3 to 30 carbon atoms, for example, N,N-dialkyl (carbon number 1 to 6) or diaralkyl (carbon number 7 to 15) (meth)acrylamide (N,N-dimethyl acrylamide, N,N-dibenzyl acrylamide, or the like), diacetone acrylamide (ii) Amide group-containing vinyl compound having 4 to 20 carbon atoms, except for the (meth)acrylamide compound described above, for example, N-methyl-N-vinylacetamide, a cyclic amide [pyrrolidone compound (carbon number 6 to 13, for example, N-vinylpyrrolidone, or the like)]

(a53-2) (Meth)acrylate Compound (i) A dialkyl (carbon number 1 to 4) aminoalkyl (carbon number 1 to 4) (meth)acrylate [N,N-dimethylaminoethyl (meth)acrylate, N,N-diethylaminoethyl (meth)acrylate, t-butylaminoethyl (meth)acrylate, morpholinoethyl (meth)acrylate, or the like]

(ii) A quaternization product (product that has been quaternized using a quaternizing agent such as methyl chloride, dimethylsulfuric acid, benzyl chloride, or dimethyl carbonate) of a quaternary ammonium group-containing (meth)acrylate {tertiary amino group-containing (meth)acrylate [N,N-dimethylaminoethyl (meth)acrylate, N,N-diethylaminoethyl (meth)acrylate, or the like] or the like}

(a53-3) Heterocyclic Ring-containing Vinyl Compound

A pyridine compound (carbon number 7 to 14, for example, 2- or 4-vinylpyridine), an imidazole compound (carbon number 5 to 12, for example, N-vinylimidazole), a pyrrole compound (carbon number 6 to 13, for example, N-vinylpyrrole), or a pyrrolidone compound (carbon number 6 to 13, for example, N-vinyl-2-pyrrolidone)

(a53-4) Nitrile Group-Containing Vinyl Compound

A nitrile group-containing vinyl compound having 3 to 15 carbon atoms, for example, (meth)acrylonitrile, cyanostyrene, or a cyanoalkyl (carbon number 1 to 4) acrylate (a53-5) Other Nitrogen-Containing Vinyl Compounds A nitro group-containing vinyl compound (carbon number 8 to 16, for example, nitrostyrene) and the like (a54) Vinyl Hydrocarbons (a54-1) Aliphatic Vinyl Hydrocarbon An olefin having 2 to 18 carbon atoms or more (ethylene, propylene, butene, isobutylene, pentene, heptene, diisobutylene, octene, dodecene, octadecene, or the like), a diene having 4 to 10 carbon atoms or more (butadiene, isoprene, 1,4-pentadiene, 1,5-hexadiene, 1,7-octadiene, or the like), or the like (a54-2) Alicyclic Vinyl Hydrocarbon A cyclic unsaturated compound having 4 to 18 carbon atoms or more, for example, a cycloalkene (for example, cyclohexene), a (di)cycloalkadiene [for example, (di)cyclopentadiene], a terpene (for example, pynene and limonene), or indene (a54-3) Aromatic Vinyl Hydrocarbon An aromatic unsaturated compound having 8 to 20 carbon atoms or more, for example, styrene, α-methylstyrene, vinyltoluene, 2,4-dimethylstyrene, ethylstyrene, isopropylstyrene, butylstyrene, phenylstyrene, cyclohexylstyrene, or benzylstyrene (a55) Vinyl Ester An aliphatic vinyl ester [carbon number 4 to 15, for example, an alkenyl ester of an aliphatic carboxylic acid (mono- or dicarboxylic acid) (for example, vinyl acetate, vinyl propionate, vinyl butyrate, diallyl adipate, isopropenyl acetate, or vinyl methoxyacetate)], or an aromatic vinyl ester [carbon number 9 to 20, for example, an alkenyl ester of an aromatic carboxylic acid (mono- or dicarboxylic acid) (for example, vinyl benzoate, diallyl phthalate, or methyl-4-vinyl benzoate), an aromatic ring-containing ester of an aliphatic carboxylic acid (for example, acetoxystyrene)]

(a56) Vinyl Ether

An aliphatic vinyl ether [carbon number 3 to 15, for example, a vinyl alkyl (carbon number 1 to 10) ether (vinyl methyl ether, vinyl butyl ether, vinyl 2-ethylhexyl ether, or the like), a vinyl alkoxy (carbon number 1 to 6) alkyl (carbon number 1 to 4) ether (vinyl-2-methoxyethyl ether, methoxybutadiene, 3,4-dihydro-1,2-pyran, 2-butoxy-2'-vinyloxydiethyl ether, vinyl-2-ethyl mercaptoethyl ether, or the like), a poly (2 to 4) (meth)allyloxyalkane (carbon number 2 to 6) (diallyloxyethane, triallyloxyethane, tetraallyloxybutane, tetramethallyloxyethane, or the like)], an aromatic vinyl ether (carbon number 8 to 20, for example, vinyl phenyl ether or phenoxystyrene)

(a57) Vinyl Ketone

An aliphatic vinyl ketone (carbon number 4 to 25, for example, vinyl methyl ketone or vinyl ethyl ketone), an aromatic vinyl ketone (carbon number 9 to 21, for example, vinyl phenyl ketone)

(a58) Unsaturated Dicarboxylic Acid Diester

An unsaturated dicarboxylic acid diester having 4 to 34 carbon atoms, for example, a dialkyl fumarate (two alkyl groups are linear, branched, or alicyclic groups each having 1 to 22 carbon atoms), or a dialkyl maleate (two alkyl groups are linear, branched, or alicyclic groups each having 1 to 22 carbon atoms)

Among those listed as examples as (a5), preferred examples from the viewpoint of voltage resistance include (a51), (a52), and (a53).

Regarding the polymer (A1), the contents of the monomer (a1) having a carboxyl group or an acid anhydride group, the monomer (a2) represented by General Formula (1), the ester compound (a3) of a monohydric aliphatic alcohol having 1 to 3 carbon atoms and (meth)acrylic acid, the salt (a4) of an anionic monomer having a polymerizable unsaturated double bond and an anionic group, and the radical-polymerizable monomer (a5) are preferably 0.1 to 80% by mass of (a1), 0.1 to 99.9% by mass of (a2), 0 to 60% by mass of (a3), 0 to 15% by mass of (a4), and 0 to 99.8% by mass of (a5) based on the mass of the polymer (A1). When the contents of the monomers are in the above-described ranges, the liquid absorptivity for the non-aqueous electrolyte solution becomes satisfactory.

A preferred lower limit of the number average molecular weight of the polymer (A1) is 3,000, more preferably 50,000, and even more preferably 60,000, and a preferred upper limit is 2,000,000, more preferably 1,500,000, even more preferably 1,000,000, and particularly preferably 120,000.

The number average molecular weight of the polymer (A1) can be obtained by gel permeation chromatography (hereinafter, abbreviated to GPC) measurement under the following conditions.

Apparatus: Alliance GPC V2000 (manufactured by WATERS)
Solvent: Ortho-dichlorobenzene
Standard substance: Polystyrene
Detector: RI
Sample concentration: 3 mg/ml
Column stationary phase: PLgel 10 μm, MIXED-B two columns in series (manufactured by Polymer Laboratories, Ltd.)
Column temperature: 135° C.

The polymer (A1) can be produced by a known polymerization method (bulk polymerization, solution polymerization, emulsion polymerization, suspension polymerization, or the like) using a known polymerization initiator {an azo-based initiator [2,2'-azobis(2-methylpropionitrile), 2,2'-azobis(2-methylbutyronitrile), 2,2'-azobis(2,4-dimethylvaleronitrile, or the like)], a peroxide-based initiator (benzoyl peroxide, di-t-butyl peroxide, lauryl peroxide, or the like) or the like}.

The amount of the polymerization initiator used is, from the viewpoint of adjusting the number average molecular weight to a preferred range, or the like, preferably 0.01 to 5% by mass, more preferably 0.05 to 2% by mass, and even more preferably 0.1 to 1.5% by mass, based on the total mass of the monomers. The polymerization temperature and polymerization time are adjusted according to the type of the polymerization initiator or the like; however, the polymerization temperature is preferably −5 to 150° C., (more preferably 30 to 120° C.), and the reaction time is preferably 0.1 to 50 hours (more preferably 2 to 24 hours).

As the solvent used in the case of solution polymerization, for example, an ester (carbon number 2 to 8, for example, ethyl acetate and butyl acetate), an alcohol (carbon number 1 to 8, for example, methanol, ethanol, and octanol), a hydrocarbon (carbon number 4 to 8, for example, n-butane, cyclohexane, and toluene), a ketone (carbon number 3 to 9, for example, methyl ethyl ketone), an amide compound (for example, N,N-dimethyl formamide), and the like are mentioned. From the viewpoint of adjusting the number average molecular weight to a preferred range, or the like, the amount of the solvent used is preferably 5 to 900% by mass, more preferably 10 to 400% by mass, and even more preferably 30 to 300% by mass, based on the total mass of the monomers, and the monomer concentration is preferably 10 to 95% by mass, more preferably 20 to 90% by mass, and even more preferably 30 to 80% by mass.

As the dispersion medium for emulsion polymerization and suspension polymerization, water, an alcohol (for example, ethanol), an ester (for example, ethyl propionate), light naphtha, and the like may be mentioned. Examples of the emulsifier include a higher fatty acid (carbon number 10 to 24) metal salt (for example, sodium oleate and sodium stearate), a higher alcohol (carbon number 10 to 24) sulfuric acid ester metal salt (for example, sodium lauryl sulfate), ethoxylated tetramethyl decynediol, sodium sulfoethyl methacrylate, dimethylaminomethyl methacrylate, and the like. Furthermore, polyvinyl alcohol, polyvinylpyrrolidone, or the like may be added as a stabilizer.

The monomer concentration of the solution or dispersion liquid is preferably 5 to 95% by mass, more preferably 10 to 90% by mass, and even more preferably 15 to 85% by mass, and the amount of the polymerization initiator used is preferably 0.01 to 5% by mass and more preferably 0.05 to 2% by mass, based on the total mass of the monomers.

Upon polymerization, a known chain transfer agent, for example, a mercapto compound (dodecylmercaptan, n-butylmercaptan, or the like) and/or a halogenated hydrocarbon (carbon tetrachloride, carbon tetrabromide, benzyl chloride, or the like) can be used.

The polymer (A1) included in the acrylic resin may be a crosslinked polymer formed by crosslinking the polymer (A1) with a crosslinking agent (A') having a reactive functional group that reacts with a carboxyl group {preferably, a polyepoxy compound (a'1) [polyglycidyl ether (bisphenol A diglycidyl ether, propylene glycol diglycidyl ether, glycerin triglycidyl ether, and the like), and polyglycidylamine (N,N-diglycidylaniline and 1,3-bis(N,N-diglycidylaminomethyl)) and the like] and/or a polyol compound (a'2) (ethylene glycol or the like)}.

As a method of crosslinking the polymer (A1) using a crosslinking agent (A'), a method of coating the carbon-based negative electrode active material with the polymer (A1) and then performing crosslinking may be mentioned. Specifically, a method of producing a carbon-based coated negative electrode active material in which the carbon-based negative electrode active material is coated with the polymer (A1), by mixing a resin solution including the carbon-based negative electrode active material and the polymer (A1) and removing the solvent, subsequently causing solvent removal and a crosslinking reaction by mixing a solution including the crosslinking agent (A') with the carbon-based coated negative electrode active material and heating the mixture, and thereby causing a reaction by which the polymer (A1) is crosslinked by the crosslinking agent (A') to become a polymer compound, at the surface of the carbon-based negative electrode active material may be mentioned.

The heating temperature is adjusted according to the type of the crosslinking agent; however, in a case where the polyepoxy compound (a'1) is used as the crosslinking agent, the heating temperature is preferably 70° C. or higher, and in a case where the polyol compound (a'2) is used, the heating temperature is preferably 120° C. or higher.

It is preferable that the negative electrode coating layer further contains a conductive aid. The conductive aid is selected from materials having electrical conductivity, and specifically, carbon [graphite and carbon black (acetylene black, Ketjen black (registered trademark), furnace black, channel black, thermal lamp black, or the like), and the like], carbon fibers such as a PAN-based carbon fiber and a pitch-based carbon fiber, carbon nanofiber and carbon nanotube, and metals [nickel, aluminum, stainless steel (SUS), silver, copper, titanium, and the like] can be used. These conductive aids may be used singly or two or more kinds may be used in combination. Further, alloys or metal oxides of the above-described metals may also be used. From the viewpoint of electrical stability, aluminum, stainless steel, carbon, silver, copper, titanium, and mixtures thereof are preferred, silver, aluminum, stainless steel, and carbon are more preferred, and carbon is even more preferred. Further, these conductive aids may be materials obtained by coating particulate ceramic materials or resin materials with conductive materials (metallic materials among the conductive aids described above) by plating or the like. A polypropylene resin kneaded with graphene is also preferred as the conductive aid.

The average particle size of the conductive aid is not particularly limited; however, from the viewpoint of the electric characteristics of the negative electrode for a lithium ion battery, the average particle size is preferably 0.01 to 10 μm, more preferably 0.02 to 5 μm, and even more preferably 0.03 to 1 μm. Incidentally, in the present specification, the particle size of the conductive aid means the maximum distance L among the distances between any arbitrary two points on the contour line of the particles formed by the conductive aid. As the value of the "average particle size of the conductive aid", a value calculated as an average value of the particle sizes of particles observed in several to several ten visual fields using an observation means such as a scanning electron microscope (SEM) or a transmission electron microscope (TEM) is to be employed.

The shape (form) of the conductive aid is not limited to a particulate form, and may be a form other than a particulate form, or, for example, the conductive aid may be a fibrous conductive aid.

Examples of the fibrous conductive aid include conductive fibers obtained by uniformly dispersing a highly conductive metal or graphite in synthetic fibers, metal fibers obtained by fiberizing a metal such as stainless steel, conductive fibers obtained by coating the surface of an organic fiber with a metal, conductive fibers obtained by coating the surface of an organic material with a resin containing a conductive material, and the like. The average fiber diameter of the fibrous conductive aid is preferably 0.1 to 30 μm and more preferably 0.1 to 20 μm.

In a case where the negative electrode coating layer contains a conductive aid, the mass of the conductive aid contained in the negative electrode coating layer is preferably 15 to 75% by mass with respect to the total mass of the polymer compound as a coating resin and the conductive aid.

In a case where the negative electrode coating layer of the carbon-based coated negative electrode active material contains a conductive aid, a conductive path between active materials can be maintained by the effect of the conductive aid contained in the negative electrode coating layer even if a SEI film is formed on the surface of the carbon-based negative electrode active material after pre-charging, and an increase in resistance caused by the formation of the SEI film can be suppressed, which is preferable. When the ratio of the conductive aid is in the above range, resistance suppression becomes easier, which is more preferable.

The negative electrode active material composition that constitutes the negative electrode active material layer may contain a conductive material other than the above-described conductive aid. When the negative electrode active material layer contains a conductive material, the conductive path between active materials is easily maintained, which is preferable. As the conductive material, the same material as the conductive aid described above can be used, and preferred materials are the same.

In a case where the negative electrode active material layer contains a conductive material, the ratio of the mass of the conductive material to the mass of the negative electrode active material is not particularly limited, but is preferably 0 to 10% by mass.

In the negative electrode for a lithium ion battery of the present invention, it is preferable that the negative electrode active material layer is provided on the negative electrode current collector.

Examples of a material that constitutes the negative electrode current collector include metal materials such as copper, aluminum, titanium, stainless steel, nickel, and alloys thereof, and the like. Among these, from the viewpoints of weight saving, corrosion resistance, and high conductivity, copper is preferred. The negative electrode current collector may be a current collector formed from calcined carbon, an electroconductive polymer, conductive glass, and the like, or may be a resin current collector formed from a conductive agent and a resin.

The shape of the negative electrode current collector is not particularly limited, but a sheet-shaped current collector formed from the above-described material and a deposition layer formed from fine particles configured by the above-described material may be employed.

The thickness of the negative electrode current collector is not particularly limited, but is preferably 50 to 500 µm.

As a conductive agent that constitutes the resin current collector, the same material as the conductive material that is an arbitrary component of the negative electrode active material layer can be suitably used.

Examples of the resin that constitutes the resin current collector include polyethylene (PE), polypropylene (PP), polymethylpentene (PMP), polycycloolefin (PCO), polyethylene terephthalate (PET), polyether nitrile (PEN), polytetrafluoroethylene (PTFE), styrene-butadiene rubber (SBR), polyacrylonitrile (PAN), polymethyl acrylate (PMA), polymethyl methacrylate (PMMA), polyvinylidene fluoride (PVdF), an epoxy resin, a silicone resin, mixtures thereof, and the like. From the viewpoint of electrical stability, polyethylene (PE), polypropylene (PP), polymethylpentene (PMP), and polycycloolefin (PCO) are preferred, and polyethylene (PE), polypropylene (PP), and polymethylpentene (PMP) are more preferred.

Hereinafter, the method for producing a negative electrode for a lithium ion battery of the present invention will be described.

The method for producing a negative electrode for a lithium ion battery of the present invention includes a step of forming a coating film on a current collector or a separator by using a slurry containing a negative electrode active material composition, which contains a silicon-based negative electrode active material and a carbon-based negative electrode active material, and a dispersion medium. The production method further includes a step of doping the silicon-based negative electrode active material with lithium ions and a step of doping the carbon-based negative electrode active material with lithium ions before or after the step of forming the coating film and before assembling a lithium ion battery. The production method has a feature in that the method does not substantially include a step of drying the coating film.

Incidentally, the order of the respective steps described above is not particularly limited. For example, after the step of doping the silicon-based negative electrode active material with lithium ions and the step of doping the carbon-based negative electrode active material with lithium ions are performed simultaneously or separately, the step of forming the coating film may be performed; or after the step of forming the coating film is performed, the step of doping the silicon-based negative electrode active material with lithium ions and the step of doping the carbon-based negative electrode active material with lithium ions maybe performed simultaneously. That is, the silicon-based negative electrode active material and the carbon-based negative electrode active material contained in the slurry may be a silicon-based negative electrode active material and a carbon-based negative electrode active material which have not been doped with lithium ions or may be a silicon-based negative electrode active material and a carbon-based negative electrode active material which have been doped with lithium ions.

Further, after the step of doping the silicon-based negative electrode active material with lithium ions is performed, the step of forming the coating film may be performed, and then the step of doping the carbon-based negative electrode active material with lithium ions may be performed; or after the step of doping the carbon-based negative electrode active material with lithium ions, the step of forming the coating film may be performed, and then step of doping the silicon-based negative electrode active material with lithium ions may be performed.

Incidentally, in any cases, it is essential that the step of forming the coating film, the step of doping the silicon-based negative electrode active material with lithium ions, and the step of doping the carbon-based negative electrode active material with lithium ions are performed before assembling a lithium ion battery (a lithium ion battery to which the negative electrode for a lithium ion battery according to the present invention is applied).

Specific examples of embodiments include the following four embodiments.

(First Embodiment)

An embodiment in which the step of doping the silicon-based negative electrode active material with lithium ions and the step of doping with lithium ions are performed simultaneously (Second Embodiment)

An embodiment in which the step of doping each of the silicon-based negative electrode active material and the carbon-based negative electrode active material with lithium ions is separately performed and a step of mixing the silicon-based negative electrode active material doped with lithium ions and the carbon-based negative electrode active material doped with lithium ions is further included (Third Embodiment)

An embodiment in which the step of doping the carbon-based negative electrode active material with lithium ions is a step of doping the carbon-based negative electrode active material, which is contained in a mixture of the carbon-based negative electrode active material and the silicon-based negative electrode active material doped with lithium ions, with lithium ions (Fourth Embodiment)

An embodiment in which the step of doping the silicon-based negative electrode active material with lithium ions is a step of doping the silicon-based negative electrode active material, which is contained in a mixture of the silicon-based negative electrode active material and the carbon-based negative electrode active material doped with lithium ions, with lithium ions The respective embodiments described above will be described below.

(First Embodiment)

In the first embodiment, a mixed active material containing the silicon-based negative electrode active material and the carbon-based negative electrode active material is doped with lithium ions simultaneously. Specifically, there are mentioned a method in which a negative electrode for pre-charging having a negative electrode active material layer, which contains a silicon-based negative electrode active material and a carbon-based negative electrode active material, is produced, a battery for pre-charging provided with a negative electrode for pre-charging and a positive electrode for pre-charging is produced, and then pre-charging is performed with respect to the battery for pre-charging, a method of bringing a lithium ion source into contact with a mixed active material in a raw material slurry so that the mixed active material is doped with lithium ions, and the like. First, an example of a method of performing pre-charging with respect to a battery for pre-charging will be described in the following (3-1) to (3-3).

(3-1-a) Examples of a method for producing a negative electrode for pre-charging include a method for producing a negative electrode for pre-charging by applying a raw material slurry onto a film and fixing a silicon-based negative electrode active material and a carbon-based negative electrode active material (that, is a mixed active material) onto the film by pressurization or depressurization. The raw material slurry is obtained by mixing a mixed active material and a dispersion medium.

Examples of the dispersion medium contained in the raw material slurry include an electrolyte solution, a non-aqueous solvent, and the like. Among these, an electrolyte solution is preferred. That is, the raw material slurry is preferably an electrolyte solution slurry containing a particulate mixed active material and an electrolyte solution. As the electrolyte solution, a non-aqueous electrolyte solution containing an electrolyte and a non-aqueous solvent which is used in production of a lithium ion battery can be used.

As the electrolyte contained in the electrolyte solution, an electrolyte that is used in known electrolyte solutions, or the like can be used. Examples thereof include inorganic acid lithium salt-based electrolytes such as $LiPF_6$, $LiBF_4$, $LiSbF_6$, $LiAsF_6$, and $LiClO_4$, sulfonylimide-based electrolytes having a fluorine atom such as $LiN(FSO_2)_2$, $LiN(CF_3SO_2)_2$, and $LiN(C_2F_5SO_2)_2$, sulfonylmethide-based electrolytes having a fluorine atom such as $LiC(CF_3SO_2)_3$, and the like.

As the non-aqueous solvent contained in the electrolyte solution, a non-aqueous solvent that is used in known electrolyte solutions, or the like can be used, for example, a lactone compound, a cyclic or chain-like carbonic acid ester, a chain-like carboxylic acid ester, a cyclic or chain-like ether, a phosphoric acid ester, a nitrile compound, an amide compound, a sulfone, a sulfolane, or the like, and mixtures thereof can be used. The non-aqueous solvent may be used singly or two or more kinds may be used in combination.

Examples of the lactone compound may include 5-membered ring (γ-butyrolactone, γ-valerolactone, and the like) and 6-membered ring lactone compounds (δ-valerolactone and the like), and the like. Examples of the cyclic carbonic acid ester include propylene carbonate, ethylene carbonate, butylene carbonate, and the like. Examples of the chain-like carbonic acid ester include dimethyl carbonate, methylethyl carbonate, diethyl carbonate, methyl-n-propyl carbonate, ethyl-n-propyl carbonate, di-n-propyl carbonate, and the like. Examples of the chain-like carboxylic acid ester include methyl acetate, ethyl acetate, propyl acetate, methyl propionate, and the like. Examples of the cyclic ether include tetrahydrofuran, tetrahydropyran, 1,3-dioxolane, 1,4-dioxane, and the like. Examples of the chain-like ether include dimethoxymethane, 1,2-dimethoxyethane, and the like. Examples of the phosphoric acid ester include trimethyl phosphate, triethyl phosphate, ethyldimethyl phosphate, diethylmethyl phosphate, tripropyl phosphate, tributyl phosphate, tri(trifluoromethyl) phosphate, tri(trichloromethyl) phosphate, tri(trifluoroethyl) phosphate, tri(triperfluoroethyl) phosphate, 2-ethoxy-1,3,2-dioxaphospholan-2-one, 2-trifluoroethoxy-1,3,2-dioxaphospholan-2-one, 2-methoxyethoxy-1,3,2-dioxaphospholan-2-one, and the like. Examples of the nitrile compound include acetonitrile and the like. Examples of the amide compound include N,N-dimethyl formamide (hereinafter, also referred to as DMF) and the like. Examples of the sulfone include chain-like sulfones such as dimethylsulfone and diethylsulfone, cyclic sulfones such as sulfolane, and the like.

Among the non-aqueous solvents, from the viewpoints of battery power output and charge-discharge cycle characteristics, preferred are a lactone compound, a cyclic carbonic acid ester, a chain-like carbonic acid ester, and a phosphoric acid ester. More preferred are a lactone compound, a cyclic carbonic acid ester, and a chain-like carbonic acid ester, and particularly preferred are a cyclic carbonic acid ester and a mixed liquid of a cyclic carbonic acid ester and a chain-like carbonic acid ester. Most preferred is a mixed liquid of ethylene carbonate (EC) and propylene carbonate (PC), a mixed liquid of ethylene carbonate (EC) and dimethyl carbonate (DMC), or a mixed liquid of ethylene carbonate (EC) and diethyl carbonate (DEC).

The electrolyte concentration of the non-aqueous electrolyte solution is not particularly limited, but from the viewpoints of handleability of the electrolyte solution and battery capacity, is preferably 0.5 to 5 mol/L, more preferably 0.8 to 3 mol/L, and even more preferably 1 to 2 mol/L.

Regarding the non-aqueous solvent that is also used as the dispersion medium contained in the raw material slurry, the same non-aqueous solvent as the non-aqueous solvent contained in the electrolyte solution can also be used.

As the film, a film capable of separating the mixed active material and the dispersion medium in pressurization or depressurization, which will be subsequently performed, is preferred. Further, when the film is formed from a material having high conductivity (conductive material), the film can be used instead of the current collector, and even when the current collector and the film are brought into contact with each other, conductivity is not inhibited, which is preferable. For example, a material having an electrical conductivity of 100 mS/cm or more can be suitably used. Examples of the material having such a characteristic include filter paper blended with conductive fibers such as carbon fibers, a metallic mesh, and the like.

As the metallic mesh, a stainless steel mesh is preferably used, and examples thereof include a SUS316 twilled Dutch weave metallic mesh (manufactured by SUNNET INDUSTRIAL CO., LTD.), and the like. The mesh size of the metallic mesh is preferably a degree that does not allow the active material particles and a conductive member to pass through the metallic mesh, and for example, a metallic mesh of 2300 mesh is preferably used.

The raw material slurry can be applied onto the film using an arbitrary coating device such as a bar coater or a brush.

Subsequently, the mixed active material is fixed onto the film by pressurization or depressurization. Examples of a pressurization operation method include a method of performing pressing from the upper side of an applied surface of the raw material slurry using a pressing machine. Further, examples of a depressurization operation method include a method of performing suction using a vacuum pump with filter paper, a mesh, or the like applied to the surface of the film to which the raw material slurry is not applied. By pressurization or depressurization, the dispersion medium is removed from the raw material slurry and the mixed active material is fixed onto the film.

As described above, when the film is formed from a conductive material, the film can be used as the current collector. Alternatively, the current collector and the film maybe brought into contact with each other so that they can function as one current collector. Further, when the film is formed from a material having no conductivity, the film may be disposed at the separator side. Alternatively, the film may be used as a separator. Examples of the film formed from a material having no conductivity include an aramid separator (manufactured by Japan Vilene Company, Ltd.), and the like. In a case where the dispersion medium is an electrolyte solution, the film is a film impermeable to the mixed active material but permeable to the electrolyte solution, and only the electrolyte solution may be allowed to permeate the film by pressurization or depressurization so as to be removed.

Further, after the pressurization or depressurization, the raw material slurry may be pressurized at a higher pressure. This step (also referred to as a press step) is a step in which the pressure difference is adjusted to be greater than that in the pressurization or depressurization step to increase the density of the mixed active material. The press step is a concept which encompasses both embodiments of pressurization after the depressurization step and pressurization at a higher pressure after the depressurization step.

Further, a step of transferring the negative electrode for pre-charging fixed onto the film to a principal surface of a current collector or a separator may be performed. In this case, it is preferable that a principal surface opposite to the film among principal surfaces of the negative electrode for pre-charging is brought into contact with the principal surface of the current collector or the separator to be transferred. In a case where the film is formed from a conductive material and the film is used instead of the current collector, it is preferable that a principal surface opposite to the film is brought into contact with the principal surface of separator to be transferred. Further, in a case where the film is not used as the current collector, a step of removing the film is preferably performed after the transferring.

(3-1-b) The production of the negative electrode for pre-charging can also be performed by the following method. That is, the method includes a step of applying a raw material slurry onto a current collector to form a slurry layer on the current collector and a step of disposing a separator on the slurry layer and absorbing liquid from an upper surface side of the separator to fix the mixed active material between the current collector and the separator.

First, the raw material slurry containing the mixed active material is applied onto the current collector to form a slurry layer. Examples of the current collector include aluminum, copper, aluminum, titanium, stainless steel, nickel, calcined carbon, an electroconductive polymer, conductive glass, and the like. As the slurry, the same slurry as the raw material slurry described above can be used. Conductive fibers as a conductive member may be further added to the slurry and the conductive fibers may be dispersed in the slurry. The slurry is preferably an electrolyte solution slurry containing an electrolyte solution. As the electrolyte solution, the same as the electrolyte solution slurry described above can be used. Further, the slurry may be a solvent slurry containing a solvent. The slurry can be applied onto the current collector using an arbitrary coating device such as a bar coater or a brush.

Subsequently, the separator is placed on the slurry layer, the liquid is absorbed from the upper surface side of the separator, and the mixed active material is fixed between the current collector and the separator. First, the separator is placed on the slurry layer. Then, the liquid is absorbed from the upper surface side of the separator. Examples of the separator include aramid separators (manufactured by Japan Vilene Company, Ltd.), microporous polyethylene films, microporous polypropylene films, multilayer films composed of a porous polyethylene film and a porous polypropylene film, nonwoven fabrics containing polyester fibers, aramid fibers, glass fibers, or the like, separators including ceramic fine particles such as silica, alumina, or titania particles attached to the surface of any of these films or nonwoven fabrics, and the like.

For liquid absorption, the pressure may be applied to the separator from the upper surface side or the lower surface side of the separator, and the liquid exuded from the upper surface of the separator may be absorbed, or the liquid may be drawn from the upper surface side of the separator by reducing pressure. Further, a liquid-absorbing material may be placed on the upper surface of the separator to absorb the liquid from the upper surface side of the separator. As the liquid-absorbing material, a liquid-absorbing cloth such as towel, paper, a liquid-absorbing resin, and the like can be used. The electrolyte solution or the solvent is removed from the slurry by liquid absorption, and the mixed active material is fixed between the current collector and the separator. This form is loosely retained to the extent that the mixed active material does not flow. The method for applying pressure is not particularly limited, but various methods can be executed. For example, a method using a known pressing machine and a method of placing a heavy material or the like as a weight to apply pressure are mentioned, and the pressure maybe applied under vibrations with an ultrasonic vibrator or the like. In the case of applying pressure to the separator from the upper surface side or the lower surface side of the separator, the pressure is preferably 0.8 to 41 $kg/cm^2$ and more preferably 0.9 to 10 $kg/cm^2$. When the pressure is in the above range, the capacity of a battery can be increased, which is preferable.

In the negative electrode for pre-charging produced in this way, a first main surface of the negative electrode for pre-charging is in contact with the separator, and a second main surface of the negative electrode for pre-charging is in contact with the current collector. According to such a method for producing a negative electrode for pre-charging, the electrode is produced in a state of being interposed between the separator and the current collector. Therefore, it is not necessary to separately perform a step of disposing the separator and the current collector at both sides of the electrode, and an electrode of a preferred form as a bipolar electrode is obtained with a few step, which is preferable.

(3-2) Next, a battery for pre-charging provided with a negative electrode for pre-charging and a positive electrode for pre-charging is produced. For example, the battery for pre-charging can be obtained as follows: a negative electrode for pre-charging is combined with a positive electrode for pre-charging as a counter electrode and housed with a separator in a cell container, an electrolyte solution is injected into the cell container, and the cell container is sealed. Further, the battery for pre-charging can also be obtained as follows: a positive electrode for pre-charging is formed on one surface of the current collector and a negative electrode for pre-charging is formed on the other surface of the current collector to produce a bipolar electrode, the bipolar electrode is laminated with a separator and housed in a cell container, an electrolyte solution is injected into the cell container, and the cell container is sealed.

As the positive electrode for pre-charging, a positive electrode having a positive electrode active material or a lithium metal electrode can be used, but since the positive electrode active material is expensive, it is preferable to use a lithium metal electrode. In the case of using a positive electrode having a positive electrode active material, the positive electrode having a positive electrode active material can be produced by applying the positive electrode active material to the current collector using a binding agent (binder) and drying. Examples of the positive electrode active material include complex oxides of lithium and transition metals (for example, $LiCoO_2$, $LiNiO_2$, $LiMnO_2$, and $LiMn_2O_4$), phosphates of lithium and transition metals (for example, $LiFePO_4$), and the like. Incidentally, examples of the binding agent include those mentioned as the binding agent that is not contained in the negative electrode active material layer in the present specification. Examples of the current collector include copper, aluminum, titanium, stainless steel, nickel, calcined carbon, an electroconductive polymer, conductive glass, and the like. As the separator, the separators mentioned above as the separators that can be used in production of the negative electrode for pre-charging can be used. As the electrolyte solution, the electrolyte solutions mentioned above as the electrolyte solutions contained in the raw material slurry can be used.

(3-3) Pre-charging is performed with respect to the battery for pre-charging. According to this, the mixed active material containing the silicon-based negative electrode active material and the carbon-based negative electrode active material can be doped with lithium ions simultaneously. The method for pre-charging is not particularly limited, but a method in which the battery for pre-charging is subjected to one charge-discharge cycle is preferred. According to the above-described method, the silicon-based negative electrode active material doped with lithium ions and the carbon-based negative electrode active material doped with lithium ions can be obtained.

As the method for producing a negative electrode for a lithium ion battery of the present invention using the silicon-based negative electrode active material doped with lithium ions and the carbon-based negative electrode active material doped with lithium ions (collectively referred to as a mixed active material doped with lithium ions), for example, the following methods are exemplified.

A battery for pre-charging is disassembled to extract a mixed active material doped with lithium ions, a slurry (dispersion liquid) dispersed at a concentration of 30 to 60% by mass based on the mass of the solvent is applied onto a negative electrode current collector with a coating device such as a bar coater, the solvent is then removed by a method of absorbing liquid by a nonwoven fabric being left to stand still on the surface thereof, a method of performing pressurization or depressurization, or the like, and if necessary, pressing is performed using a pressing machine. Incidentally, the negative electrode active material layer is not necessarily formed directly on the negative electrode current collector, and a layered product (the negative electrode active material layer) obtained, for example, by applying the above-described slurry onto the surface of an aramid separator and the like and removing the solvent is laminated on the negative electrode current collector, so that the negative electrode for a lithium ion battery of the present invention can also be produced. As the solvent that disperses the mixed active material doped with lithium ions, an electrolyte solution is preferably used, and as the electrolyte solution, the same as the electrolyte solution used in the electrolyte solution slurry described above can be used.

Further, the negative electrode for pre-charging extracted by disassembling the battery for pre-charging can be used as the negative electrode for a lithium ion battery.

(Second Embodiment)

In the second embodiment, the silicon-based negative electrode active material and the carbon-based negative electrode active material are each doped with lithium ions. Instead of the "mixed active material" in the first embodiment, a raw material slurry containing only a silicon-based negative electrode active material and a raw material slurry containing only a carbon-based negative electrode active material are each produced. Then, the silicon-based negative electrode active material and the carbon-based negative electrode active material contained in the raw material slurries are each doped with lithium ions using the same method as in the first embodiment. Then, a silicon-based negative electrode active material doped with lithium ions and a carbon-based negative electrode active material doped with lithium ions are produced separately.

In a case where the silicon-based negative electrode active material doped with lithium ions and the carbon-based negative electrode active material doped with lithium ions are each obtained in the battery for pre-charging, the battery for pre-charging is disassembled to extract the negative electrode for pre-charging, and then a dispersion medium is added to the silicon-based negative electrode active material and the carbon-based negative electrode active material fixed to the negative electrode for pre-charging to form a slurry again. Then, a slurry containing the silicon-based negative electrode active material doped with lithium ions and a slurry containing the carbon-based negative electrode active material doped with lithium ions are obtained and these two slurries are mixed, thereby obtaining a mixed slurry containing the silicon-based negative electrode active material doped with lithium ions and the carbon-based negative electrode active material doped with lithium ions. Incidentally, a mixed slurry may be obtained by adding a dispersion medium to a mixture of the silicon-based negative electrode active material and the carbon-based negative electrode active material fixed to the negative electrode for pre-charging. The negative electrode for a lithium ion battery can be produced using this mixed slurry.

(Third Embodiment)

In the third embodiment, first, only the silicon-based negative electrode active material is doped with lithium ions. Instead of the "mixed active material" in the first embodiment, a raw material slurry containing only the silicon-based negative electrode active material is produced. Then, using the same method as in the first embodiment, the silicon-based negative electrode active material contained in the raw material slurry is doped with lithium ions and a silicon-based negative electrode active material doped with lithium ions is produced.

In a case where the silicon-based negative electrode active material doped with lithium ions is obtained in the battery for pre-charging, the battery for pre-charging is disassembled to extract the negative electrode for pre-charging, and then a dispersion medium is added to the silicon-based negative electrode active material fixed to the negative electrode for pre-charging to form a slurry again. Then, a slurry containing the silicon-based negative electrode active material doped with lithium ions is obtained. To this slurry, a carbon-based negative electrode active material not doped with lithium ions is mixed in a state of a powder or a slurry to obtain a mixed slurry containing the silicon-based negative electrode active material doped with lithium ions and the carbon-based negative electrode active material not doped with lithium ions. Then, the carbon-based negative electrode active material contained in the mixed slurry is doped with lithium ions.

(Fourth Embodiment)

In the fourth embodiment, first, only the carbon-based negative electrode active material is doped with lithium ions. Instead of the "mixed active material" in the first embodiment, a raw material slurry containing only the carbon-based negative electrode active material is produced. Then, using the same method as in the first embodiment, the carbon-based negative electrode active material contained in the raw material slurry is doped with lithium ions, and a carbon-based negative electrode active material doped with lithium ions is produced.

In a case where the carbon-based negative electrode active material doped with lithium ions is obtained in the battery for pre-charging, the battery for pre-charging is disassembled to extract the negative electrode for pre-charging, and then a dispersion medium is added to the carbon-based negative electrode active material fixed to the negative electrode for pre-charging to form a slurry again. Then, a slurry containing the carbon-based negative electrode active material doped with lithium ions is obtained. To this slurry, a silicon-based negative electrode active material not doped with lithium ions is mixed in a state of a powder or a slurry to obtain a mixed slurry containing the carbon-based negative electrode active material doped with lithium ions and the silicon-based negative electrode active material not doped with lithium ions. Then, the silicon-based negative electrode active material contained in the mixed slurry is doped with lithium ions.

Next, the step of forming a coating film on a current collector or a separator using a slurry containing a negative electrode active material composition, which contains a silicon-based negative electrode active material and a carbon-based negative electrode active material, and a dispersion medium will be described. In the present invention, in order to obtain a negative electrode for a lithium ion battery having a negative electrode active material layer formed from a non-bound body of a negative electrode active material composition containing a carbon-based negative electrode active material doped with lithium ions and a silicon-based negative electrode active material doped with lithium ions, it is preferable that the slurry does not substantially contain a binding agent. In the present specification, the fact that the slurry does not substantially contain a binding agent specifically means that the content of the binding agent is 1% by mass or less with respect to 100% by mass of the total solid content amount contained in the slurry. The content of the binding agent is more preferably 0.5% by mass or less, even more preferably 0.2% by mass or less, particularly preferably 0.1% by mass or less, and most preferably 0% by mass.

Incidentally, in a case where the negative electrode for pre-charging after being doped with lithium ions is used as the negative electrode for a lithium ion battery, the step of forming a coating film for forming the negative electrode active material layer of the negative electrode for pre-charging corresponds to the present step.

In the present invention, in order to obtain the negative electrode for a lithium ion battery having a negative electrode active material layer formed from a non-bound body of a negative electrode active material composition containing a carbon-based negative electrode active material doped with lithium ions and a silicon-based negative electrode active material doped with lithium ions, it is essential not to substantially include the step of drying the coating film. In the present specification, the face that the step of drying the coating film is not substantially included means that a step of removing the dispersion medium (solvent) in which the solid content concentration of the coating film (negative electrode active material layer) is 99% by mass or more is not performed. When the step of drying the coating film is not substantially included, even in a case where a binding agent is contained in the slurry, the active materials and the active material particles and the current collector are not fixed by the binding agent being solidified, so that the state of the non-bound body can be maintained.

Incidentally, the method of removing the excess dispersion medium from the slurry after being applied by the aforementioned liquid absorption or pressurization or depressurization is not included in the step of drying the coating film in the present specification since there is no case where the solid content concentration of the coating film is 99% by mass or more.

According to the above methods, it is possible to obtain the negative electrode for a lithium ion battery of the present invention which has a negative electrode active material layer formed from a non-bound body of a negative electrode active material composition containing a carbon-based negative electrode active material doped with lithium ions and a silicon-based negative electrode active material doped with lithium ions.

Also in all embodiments, the carbon-based coated negative electrode active material may be used as the carbon-based negative electrode active material. For example, the carbon-based coated negative electrode active material can be obtained as follows: the carbon-based negative electrode active material is fed into a universal mixer, while stirring at 30 to 50 rpm, a polymer solution containing a polymer compound is added dropwise thereto over 1 to 90 minutes, a conductive aid is further mixed if necessary, the temperature is increased to 50 to 200° C. while stirring, the pressure is reduced to 0.007 to 0.04 MPa, and the mixture is kept in that state for 10 to 150 minutes.

The mixing ratio of the carbon-based negative electrode active material and the polymer compound is not particularly limited, but the mass ratio of the carbon-based negative electrode active material to the polymer compound is preferably 1:0.001 to 0.1.

Examples of the solvent that is used in production of the carbon-based coated negative electrode active material include 1-methyl-2-pyrrolidone, methyl ethyl ketone, DMF, dimethyl acetamide, N,N-dimethylaminopropylamine, and tetrahydrofuran, and the like.

By using the carbon-based coated negative electrode active material obtained in this way as the carbon-based negative electrode active material and doping the carbon-based negative electrode active material with lithium ions, a carbon-based coated negative electrode active material doped with lithium ions is obtained. In the carbon-based coated negative electrode active material doped with lithium ions, the carbon-based negative electrode active material existing at the center of the carbon-based coated negative electrode active material is doped with lithium ions.

When a lithium ion battery is produced using the negative electrode for a lithium ion battery of the present invention, a lithium ion battery can be produced by a method of combining the negative electrode with an electrode that serves as a counter electrode, accommodating the electrodes in a cell container together with a separator, pouring a non-aqueous electrolyte solution if necessary, and sealing the cell container, or the like.

Further, in the negative electrode for a lithium ion battery of the present invention having a negative electrode active material layer formed on only one surface of a negative electrode current collector, a positive electrode active material layer containing a positive electrode active material is formed on the other surface of the negative electrode current collector, and thus a bipolar electrode is produced. The bipolar electrode is laminated with a separator and is accommodated in a cell container, a non-aqueous electrolyte solution is poured if necessary, and the cell container is tightly sealed. Thus, the lithium ion battery is also obtained.

As an electrode (positive electrode) that serves as a counter electrode of the negative electrode for a lithium ion battery of the present invention, a positive electrode that is used in known lithium ion batteries can be used. As a separator and a non-aqueous electrolyte solution, the same separator and non-aqueous electrolyte solution (an electrolyte and a non-aqueous solvent) for known lithium ion batteries as those that can be used in production of the negative electrode for pre-charging are mentioned.

EXAMPLES

Next, the present invention will be described in more detail by means of Examples; however, the present invention is not limited to Examples as long as it does not depart from the gist of the present invention. Incidentally, unless particularly stated otherwise, units mean parts by mass, and % means % by mass.

Production Example 1

Production of Resin Current Collector

In a twin-screw extruder, 70 parts of polypropylene [trade name "SunAllomer PL500A", manufactured by SunAllomer Ltd.], 25 parts of carbon nanotube [trade name: "FloTube 9000", manufactured by CNano Technology Ltd.], and 5 parts of dispersant [trade name "Umex 1001", manufactured by Sanyo Chemical Industries, Ltd.] were melted and kneaded at 200° C. and at 200 rpm to obtain a resin mixture. The obtained resin mixture was stretched and rolled through a T die extrusion film molding machine to obtain a resin current collector having a film thickness of 100 μm. The resin current collector was cut into a size of 3 cm×3 cm, nickel deposition was performed on one surface, and then a terminal for current draw (5 mm×3 cm) was connected thereto.

Production Example 2

Production of Polymer Compound Solution for Coating Layer

Into a four-necked flask equipped with a stirrer, a thermometer, a reflux cooling tube, a dropping funnel, and a nitrogen gas inlet tube, 407.9 parts of DMF was introduced, and the temperature was increased to 75° C. Next, a monomer mixed liquid obtained by mixing 242.8 parts of methacrylic acid, 97.1 parts of methyl methacrylate, 242.8 parts of 2-ethylhexyl methacrylate, and 116.5 parts of DMF and an initiator solution obtained by dissolving 1.7 parts of 2,2'-azobis(2,4-dimethylvaleronitrile) and 4.7 parts of 2,2'-azobis(2-methylbutyronitrile) in 58.3 parts of DMF were continuously added dropwise under stirring into the four-necked flask over 2 hours with a dropping funnel while nitrogen was blown into the flask, and thus radical polymerization was performed. After completion of dropwise addition, a reaction was continued for 3 hours at 75° C. Next, the temperature was increased to 80° C., and the reaction was continued for 3 hours, thereby obtaining a copolymer solution having a resin solid content concentration of 50% by mass. To this, 789.8 parts of DMF was added, and a polymer compound solution for a coating layer having a resin solid content concentration of 30% by mass was obtained.

Production Example 3

Production of Carbon-based Coated Negative Electrode Active Material Particles 1

90 parts of non-graphitizable carbon powder [CARBOTRON (registered trademark) PS (F) manufactured by Kureha Battery Materials Japan Co., Ltd., volume average particle size 18 μm] was introduced into a universal mixer, HIGH SPEED MIXER FS25 [manufactured by EARTH-TECHNICA CO., LTD.], and in a state in which the carbon powder was stirred at 150 rpm at room temperature, 30 parts of the polymer compound solution for a coating layer was added dropwise over 60 minutes and mixed to have a resin solid content of 5 parts by mass, and was further stirred for 30 minutes. Next, in a state of being stirred, 5 parts of acetylene black [DENKA BLACK (registered trademark) manufactured by Denka Company Limited] was mixed in three separate portions, the temperature was increased to 70° C. while stirring was performed for 30 minutes, the pressure was reduced to 0.01 MPa, and this state was maintained for 30minutes. Through the above-described operation, carbon-based coated negative electrode active material particles 1 were obtained.

Production Example 4

Production of Carbon-based Coated Negative Electrode Active Material Particles 2

Carbon-based coated negative electrode active material particles 2 were obtained in the same manner as in Production Example 3, except that the non-graphitizable carbon powder was changed to non-graphitizable carbon powder having a different particle size [manufactured by Kureha Battery Materials Japan Co., Ltd., volume average particle size 0.1 μm].

Production Example 5

Production of Carbon-coated Silicon Particles

Silicon particles [manufactured by Sigma-Aldrich Japan, volume average particle size 1.5 μm] were introduced into a horizontal heating furnace, and a chemical vapor deposition operation at 1100° C./1000 Pa and for an average residence time of about 2 hours was performed while methane gas was allowed to flow inside the horizontal heating furnace, thereby obtaining silicon-based negative electrode active material particles (volume average particle size 1.5 μm) having a carbon amount of 2% by mass and having a surface coated with carbon.

Production Example 6

Production of Carbon-coated Silicon Oxide Particles

Silicon oxide particles [manufactured by Sigma-Aldrich Japan, volume average particle size 1.5 μm] were introduced into a horizontal heating furnace, and a chemical vapor deposition operation at 1100° C./1000 Pa and for an average residence time of about 2 hours was performed while methane gas was allowed to flow inside the horizontal heating furnace, thereby obtaining silicon-based negative electrode active material particles (volume average particle size 1.5 μm) having a carbon amount of 2% by mass and having a surface coated with carbon.

Production Example 7

Production of Silicon Composite Particles 3 parts of silicon particles [manufactured by Sigma-Aldrich Japan, volume average particle size 1.5 μm] was introduced into a universal mixer, HIGH SPEED MIXER FS25 [manufactured by EARTHTECHNICA CO., LTD.], and in a state in which stirring was performed at room temperature at 720 rpm, 10 parts of polyacrylic acid resin solution (solvent: ultrapure water, solid content concentration 10%) was added dropwise over 2 minutes, and was further stirred for 5 minutes. Next, in a state of being stirred, 1 part of acetylene black [manufactured by Denka Company Limited, DENKA BLACK (registered trademark)] was introduced, and stirring was continued for 30 minutes. Thereafter, while stirring was maintained, pressure was reduced to 0.01 MPa. Subsequently, while stirring and the degree of pressure reduction were maintained, the temperature was increased to 140° C., and stirring, the degree of pressure reduction, and the temperature were maintained for 8 hours. Thus, a volatile fraction was distilled off. A powder thus obtained was classified with a sieve having a mesh size of 20 μm, and silicon composite particles (volume average particle size 30 μm) were obtained.

Production Example 8

Production of Carbon Fibers

Carbon fibers were produced by the following method with reference to production methods disclosed in Eiichi Yasuda, Asao Oya, Shinya Komura, Shigeki Tomonoh, Takashi Nishizawa, Shinsuke Nagata, Takashi Akatsu, CARBON, 50, 2012, 1432-1434 and Eiichi Yasuda, Takashi Akatsu, Yasuhiro Tanabe, Kazumasa Nakamura, Yasuto Hoshikawa, Naoya Miyajima, TANSO, 255, 2012, pp. 254 to 265. 10 parts by mass of synthetic mesophase pitch AR·MPH [manufactured by MITSUBISHI GAS CHEMICAL COMPANY, INC.] as a carbon precursor and 90 parts by mass of polymethylpentene TPX RT18 [manufactured by Mitsui Chemicals, Inc.] were melted and kneaded at a barrel temperature of 310° C. under nitrogen atmosphere using a single-screw extruder to prepare a resin composition. The resin composition was subjected to melt extrusion and spun at 390° C. The spun resin composition was put in an electric furnace and held at 270° C. under nitrogen atmosphere for 3 hours, so that the carbon precursor was stabilized. Subsequently, the temperature of the electric furnace was increased to 500° C. over 1 hour and held at 500° C. for 1 hour, so that the polymethylpentene was decomposed and removed. The temperature of the electric furnace was increased to 1000° C. over 2 hours and held at 1000° C. for 30 minutes, so that the remaining stabilized carbon precursor was converted into conductive fibers. 90 parts by mass of the obtained conductive fibers, 500 parts by mass of water, and 1000 parts by mass of zirconia balls (φ0.1 mm) were put into a pot mill container and the conductive fibers were pulverized for 5 minutes. The zirconia balls were removed by classification and then the conductive fibers were dried at 100° C. to obtain carbon fibers. From the measurement results using SEM, the average fiber diameter of the obtained carbon fibers was 0.3 μm, the average fiber length thereof was 26 μm (aspect ratio 87), and the electrical conductivity was 600 mS/cm.

Example 1

[Production of Negative Electrode Active Material Slurry]

6 parts of the carbon-based coated negative electrode active material particles 1 obtained in Production Example 3, 3 parts of the carbon-coated silicon particles obtained in Production Example 5, and 1 part of the carbon fibers obtained in Production Example 8 as a conductive material were added to 90 parts of electrolyte solution produced by dissolving $LiPF_6$ at a ratio of 1 mol/L in a mixed solvent of ethylene carbonate (EC) and propylene carbonate (PC) (volume ratio 1:1), and then were mixed for 5 minutes at 2000 rpm using a planetary stirring type mixing and kneading apparatus {AWATORI RENTARO [manufactured by THINKY CORPORATION]}, thereby producing a negative electrode active material slurry.

[Production of Negative Electrode Active Material Layer]

A butyl rubber sheet having a φ15 mm hole (hereinafter, described as a mask) was overlapped on a φ23 mm aramid nonwoven fabric (model No. 2415R: manufactured by Japan Vilene Company, Ltd.), and the negative electrode active material slurry was added dropwise to the hole portion of the mask such that the basis weight amount of the active material would be 23.9 mg/cm$^2$. Furthermore, suction filtration (pressure reduction) was performed from the aramid nonwoven fabric side to produce a φ15 mm circular negative electrode active material layer. Next, pressing was performed at a pressure of 5 MPa for about 10 seconds to produce a negative electrode for pre-charging. Production of a battery for pre-charging and pre-charging were performed using the produced negative electrode for pre-charging by the following methods to produce a negative electrode for a lithium ion battery of the present invention.

[Production of Battery for Pre-charging]

Two sheets of a terminal (5 mm×3 cm) -attached copper foil (3 cm×3 cm, thickness 17 μm) was superimposed such that each terminal came out in the same direction, was interposed between two sheets of a commercially available thermal fusion type aluminum laminate film (10 cm×8 cm), and one edge through which the terminals came out was thermally fused, thereby producing a laminate cell for pre-charging. The aramid nonwoven fabric was removed from the negative electrode for pre-charging, the negative electrode for pre-charging was left to stand still on one of the copper foils in the laminate cell for pre-charging, and 100 μL of electrolyte solution was added thereto. Next, a separator (5 cm×5 cm, thickness 23 μm, Celgard 3501 made of PP) was left to stand still on the negative electrode for pre-charging, and 100 μL of electrolyte solution was further added thereto. A metallic lithium foil (3 cm×3 cm) was left to stand still such that the metallic lithium foil faced the negative electrode for pre-charging via the separator, 100 μL of electrolyte solution was added, the other copper foil in the laminate cell was covered thereon, and two edges that orthogonally intersected the one edge that had been previously thermally fused were heat-sealed. Thereafter, the laminate cell was tightly sealed by heat-sealing the opening while the interior of the cell was brought into a vacuum using a vacuum sealer. Thus, a battery for pre-charging was obtained.

[Pre-Charging and Production of Negative Electrodes for Lithium Ion Battery of Present Invention]

Pre-charging was performed by performing CC-CV charging at a current of 0.1 C and a minimum potential of 0 V and CC discharging at a current of 0.1 C and a maximum potential of 1.5 V with a 10-minute interval therebetween at 45° C. using a battery charge/discharge system "HJ0501SM8A" [manufactured by HOKUTO DENKO CORPORATION]. Thereafter, the battery for pre-charging was disassembled and the negative electrode was taken out, thereby obtaining a negative electrode for a lithium ion battery 1 of the present invention. The thickness of the obtained negative electrode active material layer of the negative electrode for a lithium ion battery 1 of the present invention was 350 μm.

Example 2

A battery for pre-charging was produced and pre-charging was performed in the same manner as in Example 1, except that, in the production of the negative electrode active material slurry, the carbon-coated silicon particles were changed to SiO particles as silicon oxide [manufactured by Sigma-Aldrich Japan, volume average particle size 5 μm]. Thereafter, the battery for pre-charging was disassembled to extract the negative electrode, thereby obtaining a negative electrode for a lithium ion battery 2 of the present invention. The thickness of the obtained negative electrode active material layer 2 of the negative electrode for a lithium ion battery of the present invention was 350 μm.

Example 3

A battery for pre-charging was produced and pre-charging was performed in the same manner as in Example 1, except that, in the production of the negative electrode active material slurry, the blending amount of the carbon-based coated negative electrode active material particles 1 was changed to 8.5 parts, and the carbon-coated silicon particles were changed to 0.5 parts of silicon particles [manufactured by Sigma-Aldrich Japan, volume average particle size 5 μm]. Thereafter, the battery for pre-charging was disassembled to extract the negative electrode, thereby obtaining a negative electrode for a lithium ion battery 3 of the present invention. The thickness of the obtained negative electrode active material layer 3 of the negative electrode for a lithium ion battery of the present invention was 380 μm.

Example 4

[Production of Two Types of Negative Electrode Active Material Slurry]

10 parts of the carbon-based coated negative electrode active material particles 2 (number average particle size 0.1 μm) obtained in Production Example 4 was added to 90 parts of electrolyte solution and then mixed at 2000 rpm for 5 minutes using a planetary stirring type mixing and kneading apparatus to produce a negative electrode active material slurry 4-1. 10 parts of silicon particles [manufactured by Sigma-Aldrich Japan, volume average particle size 0.01 μm] was added to 90 parts of electrolyte solution and then mixed at 2000 rpm for 5 minutes using a planetary stirring type mixing and kneading apparatus to produce a negative electrode active material slurry 4-2.

[Production of Negative Electrode Active Material Layer]

Two sets of products in which a mask having a φ70 mm hole was overlapped on a φ80 mm aramid nonwoven fabric were prepared, and the negative electrode active material slurry 4-1 or the negative electrode active material slurry 4-2 was added dropwise to the hole portion of the mask such that the total basis weight amount of the active material would be 23.9 mg/cm². Furthermore, suction filtration (pressure reduction) was performed from the aramid nonwoven fabric side to produce a φ70 mm circular carbon-based coated negative electrode active material layer or silicon-based negative electrode active material layer on each of the two aramid nonwoven fabrics. Next, pressing was performed at a pressure of 25 MPa for about 10 seconds to produce a carbon-based negative electrode for pre-charging 4-1 and a silicon-based negative electrode for pre-charging 4-2. Production of a battery for pre-charging and pre-charging were each separately performed by the following method using the produced carbon-based negative electrode for pre-charging 4-1 and silicon-based negative electrode for pre-charging 4-2. Thus, a carbon-based negative electrode active material doped with lithium ions and a silicon-based negative electrode active material doped with lithium ions used in the negative electrode for a lithium ion battery of the present invention were produced.

[Production of Battery for Pre-charging]

Two sheets of a terminal (5 mm×3 cm) -attached copper foil (9 cm×9 cm, thickness 17 μm) were superimposed such that each terminal came out in the same direction, was interposed between two sheets of a commercially available thermal fusion type aluminum laminate film (14 cm×13 cm), and one edge through which the terminals came out was thermally fused, thereby producing a laminate cell for pre-charging. Two laminate cell for pre-charging thus obtained were prepared. The aramid nonwoven fabric was removed from the carbon-based negative electrode for pre-charging 4-1 and the silicon-based negative electrode for pre-charging 4-2, the negative electrodes for pre-charging were each left to stand still on one of the copper foils in the laminate cell for pre-charging, and 150 μL of electrolyte solution was added thereto. Next, a separator (12 cm×11 cm, thickness 23 μm, Celgard 3501 made of PP) was left to stand still on each negative electrode for pre-charging, and 100 μL of electrolyte solution was further added thereto. A metallic lithium foil (7.5 cm×7.5 cm) was left to stand still such that the metallic lithium foil faced each negative electrode for pre-charging via the separator, 100 μL of electrolyte solution was added, the other copper foil in the laminate cell was covered thereon, and two edges that orthogonally intersected the one edge that had been previously thermally fused were heat-sealed. Thereafter, the laminate cell was tightly sealed by heat-sealing the opening while the interior of the cell was brought into a vacuum using a vacuum sealer. Thus, two types of battery for pre-charging were obtained.

[Pre-charging and Production of Negative Electrode for Lithium Ion Battery of Present Invention]

Pre-charging of two types of battery for pre-charging was performed by the same method as in Example 1. Thereafter, the batteries for pre-charging were disassembled to extract negative electrodes and active materials were removed from the negative electrodes and scraped. Thus, a carbon-based negative electrode active material 4-1 doped with lithium ions and a silicon-based negative electrode active material 4-2 doped with lithium ions used in the negative electrode for a lithium ion battery of the present invention were obtained.

[Production of Negative Electrode]

3.8 parts of the carbon-based negative electrode active material 4-1 doped with lithium ions, 3.2 parts of the silicon-based negative electrode active material 4-2 doped with lithium ions, 3 parts of the carbon fibers obtained in Production Example 7, and 90 parts of electrolyte solution were added and mixed, and mixed at 2000 rpm for 5 minutes using a planetary stirring type mixing and kneading apparatus to produce a negative electrode active material slurry 4-3. A mask having a ϕ15 mm hole was overlapped on a ϕ23 mm aramid nonwoven fabric, and the negative electrode active material slurry 4-3 was added dropwise to the hole portion of the mask such that the basis weight amount of the active material would be 23.9 mg/cm². Furthermore, suction filtration (pressure reduction) was performed from the aramid nonwoven fabric side to produce a ϕ15 mm circular negative electrode active material layer. Next, pressing was performed at a pressure of 5 MPa for about 10 seconds to obtain a negative electrode for a lithium ion battery 4 of the present invention. The thickness of the obtained negative electrode active material layer 4 of the negative electrode for a lithium ion battery of the present invention was 360 μm.

Example 5

A negative electrode for a lithium ion battery 5 of the present invention was obtained in the same manner as in Example 4, except that, in the production of the negative electrode of Example 4, the carbon-based negative electrode active material 4-1 doped with lithium ions was changed to 3.5 parts, the silicon-based negative electrode active material 4-2 doped with lithium ions was changed to 3.5 parts, and the basis weight amount of the negative electrode active material when an electrode was produced after doping was changed to 47.8 mg/cm². The thickness of the obtained negative electrode active material layer 5 of the negative electrode for a lithium ion battery of the present invention was 610 μm.

Example 6

A battery for pre-charging was produced and pre-charging was performed in the same manner as in Example 1, except that, in the production of the negative electrode active material slurry of Example 1, the blending amount of the carbon-based coated negative electrode active material particles 1 was changed to 8.5 parts and the silicon-based negative electrode active material was changed to 0.5 parts of the silicon-based negative electrode active material particles (carbon-coated silicon oxide particles) produced in Production Example 6. Thereafter, the battery for pre-charging was disassembled to extract the negative electrode, thereby obtaining a negative electrode for a lithium ion battery 6 of the present invention. The thickness of the obtained negative electrode active material layer 6 of the negative electrode for a lithium ion battery of the present invention was 370

Example 7

A battery for pre-charging was produced and pre-charging was performed in the same manner as in Example 1, except that, in the production of the negative electrode active material slurry of Example 1, the blending amount of the carbon-based coated negative electrode active material particles 1 was changed to 8.5 parts and the carbon-coated silicon particles were changed to 0.5 parts of the silicon composite particles produced in Production Example 7. Thereafter, the battery for pre-charging was disassembled to extract the negative electrode, thereby obtaining a negative electrode for a lithium ion battery 7 of the present invention. The thickness of the obtained negative electrode active material layer 7 of the negative electrode for a lithium ion battery of the present invention was 380 μm.

Comparative Example 1

A negative electrode active material slurry used in Comparative Example 1 was produced in the same manner as in Example 1, except that, in the production of the negative electrode active material slurry, the carbon-based coated negative electrode active material particles 1 were changed to 6 parts of non-coated non-graphitizable carbon powder [CARBOTRON (registered trademark) PS(F) manufactured by Kureha Battery Materials Japan Co., Ltd., number average particle size 18 μm] and 50 parts of N-methylpyrrolidone solution containing 5 parts of polyvinylidene fluoride (manufactured by Sigma-Aldrich) from which the moisture was removed was added to the negative electrode active material slurry. A mask having a ϕ15 mm hole was overlapped on a ϕ23 mm aramid nonwoven fabric, and the negative electrode active material slurry was added dropwise to the hole portion of the mask to have a basis weight amount of 23.9 mg/cm². Furthermore, suction filtration (pressure reduction) was performed from the aramid nonwoven fabric side to produce a ϕ15 mm circular negative electrode active material layer. Next, pressing was performed at a pressure of 5 MPa for about 10 seconds, the aramid nonwoven fabric was then removed, and drying was then performed at 100° C. for 15 minutes, thereby producing a negative electrode for pre-charging. The solid content concentration in the negative electrode active material layer of the negative electrode for pre-charging was 99% by mass or more. Next, the pre-charging was performed in the same manner as in Example 1 to obtain a negative electrode for a lithium ion battery for comparison (thickness 300 μm).

<Evaluation of Negative Electrode for Lithium Ion Battery>

A battery for evaluation was produced by the following method and the negative electrode for a lithium ion battery was evaluated.

[Production of Lithium Ion Battery]

A terminal (5 mm×3 cm)-attached copper foil (3 cm×3 cm, thickness 17 μm) was superimposed such that each terminal came out in the same direction, was interposed between two sheets of a commercially available thermal fusion type aluminum laminate film (10 cm×8 cm), and one edge through which the terminals came out was thermally fused, thereby producing a laminate cell for evaluation. The negative electrode for a lithium ion battery obtained in each of Examples or Comparative Example was disposed on one of the copper foils of the laminate cell for evaluation. 30 µL of electrolyte solution was added to the negative electrode, the separator was then disposed on the negative electrode, and 100 µL of electrolyte solution was further added. Li metal manufactured by Honjo Kinzoku (Φ15, thickness 0.5 mm) was disposed to face the negative electrode via the separator, and 100 µL of electrolyte solution was added. The other copper foil in the laminate cell for evaluation was covered thereon, and two edges that orthogonally intersected the one edge that had been previously thermally fused were heat-sealed. Subsequently, the laminate cell was tightly sealed by heat-sealing the opening while the interior of the cell was brought into a vacuum using a vacuum sealer. Thus, a lithium ion battery for evaluation was obtained.

[Evaluation of Charge-discharge Cycle Characteristics of Lithium Ion Battery]

An operation of performing CC-CV charging at a current of 0.1 C, and a maximum potential of 0 V, resting for 10 minute, and then performing CC discharging at a current of 0.1 C and a minimum potential of 1.5 V was performed in 10 cycles at 45° C. using a battery charge/discharge system "HJ0501SM8A" [manufactured by HOKUTO DENKO CORPORATION], and a capacity retention rate that is a cycle characteristic was calculated using the discharge capacity in the first cycle and the discharge capacity in the 10th cycle by the following calculation formula. Incidentally, a larger value of the capacity retention rate means that a decrease in capacity is smaller and excellent cycle characteristics are exhibited.

[Capacity retention rate (%)]=[discharge capacity in 10th cycle]÷[discharge capacity in first cycle]× 100]

[Measurement of Change Amount of Thickness of Electrode After Initial Charging]

A change amount of the thickness of the negative electrode active material after the initial charging is a value obtained by subtracting the thickness of the negative electrode active material before the initial charging from the thickness of the negative electrode active material after the initial charging. Further, the thickness of the negative electrode active material layer was measured using a contact thickness gauge [ABS Digimatic Indicator ID-CX manufactured by Mitutoyo Corporation].

In Table 1, the pre-charging method of each of Examples and Comparative Example, and the configuration and evaluation results of the negative electrode active material layer are collectively presented. In Table 1, the pre-charging method 1 means a method of simultaneously performing the step of doping the silicon-based negative electrode active material with lithium ions and the step of doping the carbon-based negative electrode active material with lithium ions, and the pre-charging method 2 means a method of separately performing the step of doping the silicon-based negative electrode active material with lithium ions and the step of doping the carbon-based negative electrode active material with lithium ions.

TABLE 1

| | | Example 1 | Example 2 | Example 3 | Example 4 | Example 5 |
|---|---|---|---|---|---|---|
| | | | | Pre-charging method | | |
| | | Method 1 | Method 1 | Method 1 | Method 2 | Method 2 |
| Configuration of negative electrode active material layer | Type of silicon-based negative electrode active material | Carbon-coated silicon | SiO | Silicon | Silicon | Silicon |
| | Number of parts of silicon-based negative electrode active material | 3 | 3 | 0.5 | 3.2 | 3.5 |
| | Volume average particle size (µm) of silicon-based negative electrode active material | 1.5 | 5 | 5 | 0.01 | 0.01 |
| | Number of parts of carbon-based negative electrode active material | 6 | 6 | 8.5 | 3.8 | 3.5 |
| | Number average particle size (µm) of carbon-based negative electrode active material | 18 | 18 | 18 | 0.1 | 0.1 |
| | Mass mixing ratio of silicon-based negative electrode active material and carbon-based negative electrode active material | 33/67 | 33/67 | 6/94 | 46/54 | 50/50 |
| | Presence or absence of coating layer of carbon-based negative electrode active material | Presence | Presence | Presence | Presence | Presence |
| | Number of parts of carbon fibers (conductive material) | 1 | 1 | 1 | 3 | 3 |
| | Presence or absence of binding material | Absence (non-bound body) | Absence (non-bound body) | Absence (non-bound body) | Absence (non-bound body) | Absence (non-bound body) |
| | Thickness of negative electrode active material layer | 350 | 350 | 380 | 360 | 610 |
| Evaluation | Capacity retention rate (%) after 10 cycles | 88 | 86 | 84 | 75 | 78 |
| | Change amount of thickness after initial charging (µm) | 4 | 5 | 6 | 12 | 9 |

TABLE 1-continued

|  |  | Example 6 | Example 7 | Comparative Example 1 |
|---|---|---|---|---|
|  |  | Pre-charging method | | |
|  |  | Method 1 | Method 1 | Method 1 |
| Configuration of negative electrode active material layer | Type of silicon-based negative electrode active material | Carbon-coated silicon oxide | Silicon composite particles | Carbon-coated silicon |
|  | Number of parts of silicon-based negative electrode active material | 0.5 | 0.5 | 3 |
|  | Volume average particle size (μm) of silicon-based negative electrode active material | 1.5 | 30 (Secondary particle size) | 1.5 |
|  | Number of parts of carbon-based negative electrode active material | 8.5 | 8.5 | 6 |
|  | Number average particle size (μm) of carbon-based negative electrode active material | 18 | 18 | 18 |
|  | Mass mixing ratio of silicon-based negative electrode active material and carbon-based negative electrode active material | 6/94 | 6/94 | 33/67 |
|  | Presence or absence of coating layer of carbon-based negative electrode active material | Presence | Presence | Absence |
|  | Number of parts of carbon fibers (conductive material) | 1 | 1 | 1 |
|  | Presence or absence of binding material | Absence (non-bound body) | Absence (non-bound body) | Presence |
|  | Thickness of negative electrode active material layer | 370 | 380 | 300 |
| Evaluation | Capacity retention rate (%) after 10 cycles | 90 | 92 | 40 |
|  | Change amount of thickness after initial charging (μm) | 2 | 5 | 60 |

As presented in Table 1, when the negative electrodes for a lithium ion battery produced in Examples 1 to 7 were used, it was possible to increase a capacity retention rate. Further, in Examples 1 to 7, the volume change (change amount of the thickness after the initial charging) was also decreased.

The present application is based on Japanese Patent Application No. 2016-246998, which has been filed on Dec. 20, 2016 and Japanese Patent Application No. 2017-238949, which has been filed on Dec. 13, 2017, the disclosures of which are incorporated herein by reference in their entirety.

INDUSTRIAL APPLICABILITY

The negative electrode for a lithium ion battery of the present invention is particularly useful as a negative electrode for bipolar secondary batteries, lithium ion batteries, and the like for cellular phones, personal computers, hybrid electric vehicles, and electric vehicles.

The invention claimed is:

1. A method for producing a negative electrode for a lithium ion battery, the method comprising a step of forming a coating film on a current collector or a separator by using a slurry containing a negative electrode active material composition, which contains a silicon-based negative electrode active material, a carbon-based negative electrode active material, and a conductive material, and a dispersion medium and forming a negative electrode active material layer formed from the negative electrode active material composition,
wherein the method further comprises a step of doping the silicon-based negative electrode active material with lithium ions and a step of doping the carbon-based negative electrode active material with lithium ions before or after the step of forming the coating film and before assembling a lithium ion battery, and
the coating film having a solid content concentration of 99% or more by mass.

2. The method for producing a negative electrode for a lithium ion battery according to claim 1, wherein a binding agent content of the slurry is 1% or less by mass.

3. The method for producing a negative electrode for a lithium ion battery according to claim 1, wherein
the step of doping the silicon-based negative electrode active material with lithium ions and
the step of doping the carbon-based negative electrode active material with lithium ions
are performed simultaneously.

4. The method for producing a negative electrode for a lithium ion battery according to claim 1, wherein
the step of doping the silicon-based negative electrode active material with lithium ions and
the step of doping the carbon-based negative electrode active material with lithium ions
are performed separately, and
the method further comprises a step of mixing the silicon-based negative electrode active material doped with lithium ions and the carbon-based negative electrode active material doped with lithium ions.

5. The method for producing a negative electrode for a lithium ion battery according to claim 1, wherein the step of doping the carbon-based negative electrode active material with lithium ions occurs while the carbon-based negative electrode active material is contained in a mixture of the carbon-based negative electrode active material and the silicon-based negative electrode active material doped with lithium ions.

6. The method for producing a negative electrode for a lithium ion battery according to claim 1, wherein the step of doping the silicon-based negative electrode active material with lithium ions occurs while the silicon-based negative electrode active material is contained in a mixture of the silicon-based negative electrode active material and the carbon-based negative electrode active material doped with lithium ions.

7. The method for producing a negative electrode for a lithium ion battery according to claim 1, wherein the silicon-based negative electrode active material and the carbon-based negative electrode active material contained in the slurry have not been doped with lithium ions.

8. The method for producing a negative electrode for a lithium ion battery according to claim 1, wherein the silicon-based negative electrode active material and the carbon-based negative electrode active material contained in the slurry have been doped with lithium ions.

9. The method for producing a negative electrode for a lithium ion battery according to claim 1, wherein the dispersion medium contains an electrolyte solution.

10. A negative electrode for a lithium ion battery, the negative electrode being obtained by the production method according to claim 1 and comprising a negative electrode active material layer formed from a non-bound body of a negative electrode active material composition which contains a carbon-based negative electrode active material doped with lithium ions and a silicon-based negative electrode active material doped with lithium ions.

11. The negative electrode for a lithium ion battery according to claim 10, wherein a surface of the carbon-based negative electrode active material is partially or entirely coated with a negative electrode coating layer containing a polymer compound that is a coating resin.

12. The negative electrode for a lithium ion battery according to claim 10, wherein the silicon-based negative electrode active material is silicon and/or a silicon compound.

13. The negative electrode for a lithium ion battery according to claim 12, wherein the silicon compound is at least one selected from the group consisting of silicon oxide (SiOx), a Si—C complex, a Si—Al alloy, a Si—Li alloy, a Si—Ni alloy, a Si—Fe alloy, a Si—Ti alloy, a Si—Mn alloy, a Si—Cu alloy, or a Si—Sn alloy.

* * * * *